United States Patent
Aoki

(10) Patent No.: US 6,831,622 B2
(45) Date of Patent: Dec. 14, 2004

(54) CIRCUIT AND METHOD FOR DRIVING ELECTRO-OPTICAL PANEL, ELECTRO-OPTICAL DEVICE, AND ELECTRONIC EQUIPMENT

(75) Inventor: Toru Aoki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 309 days.

(21) Appl. No.: 10/212,216

(22) Filed: Aug. 6, 2002

(65) Prior Publication Data

US 2003/0151713 A1 Aug. 14, 2003

(30) Foreign Application Priority Data

Aug. 23, 2001 (JP) .......................... 2001-253331
Jul. 31, 2002 (JP) .......................... 2002-223383

(51) Int. Cl.[7] ............................................ G09G 3/36
(52) U.S. Cl. .......................................... 345/87; 345/99
(58) Field of Search ........................... 345/54, 87, 88, 345/89, 90, 92, 93, 94, 95, 96, 97, 99, 100, 204, 208, 214, 209; 340/825.82, 825.79; 359/645

(56) References Cited

U.S. PATENT DOCUMENTS

| | | | | |
|---|---|---|---|---|
| 4,917,468 A | * | 4/1990 | Matsuhashi et al. | 345/92 |
| 6,307,681 B1 | * | 10/2001 | Aoki et al. | 359/645 |
| 6,456,281 B1 | * | 9/2002 | Rindal | 345/204 |
| 6,670,943 B1 | * | 12/2003 | Ishii et al. | 345/100 |
| 2003/0038766 A1 | * | 2/2003 | Lee et al. | 345/87 |
| 2003/0052852 A1 | * | 3/2003 | Oohira | 345/89 |

* cited by examiner

Primary Examiner—Amare Mengistu
Assistant Examiner—Nitin Patel
(74) Attorney, Agent, or Firm—Oliff & Berridge, PLC

(57) ABSTRACT

A video signal is sampled in response to a sampling signal, and is fed to a data line. The sampling signal is generated based on an enable signal. A timing control circuit includes a group of delay circuits to delay a reference clock signal, a selector circuit to select signals in response to a selection signal, and an enable signal generator circuit to generate an enable signal based on an enable clock signal. The selection signal is generated based on a phase difference signal and has a constant fluctuation.

25 Claims, 19 Drawing Sheets

| PD | SR | ADDITION / SUBTRACTION PROCESS |
|---|---|---|
| H | L | +1 |
| H | H | +10 |
| L | L | -1 |
| L | H | -10 |

CIRCUIT AND METHOD FOR DRIVING ELECTRO-OPTICAL PANEL, ELECTRO-OPTICAL DEVICE, AND ELECTRONIC EQUIPMENT

BACKGROUND OF THE INVENTION

1. Field of the Invention

The present invention relates to a driving circuit for driving an electro-optical panel that is free from image quality degradation due to noise, a driving method for driving the electro-optical panel, an electro-optical device, and electronic equipment.

2. Description of the Related Art

Conventional electro-optical devices, such as an active-matrix type liquid-crystal display device, include a liquid-crystal panel and a video processing circuit. The liquid-crystal panel is mainly formed of an element substrate having a matrix of pixel electrodes arranged thereon, a counter substrate having a counter electrode and a color filter arranged thereon, and a liquid crystal encapsulated between the two substrates.

A pixel electrode is arranged at an intersection of a scanning line and a data line, and is connected to a switching element such as a transistor. When a selection signal is applied to a switching element through a scanning line, the switching element becomes conductive. When a video signal is applied to the pixel electrode through the data line during the conductive state of the switching element, a charge responsive to a voltage of the video signal is stored in the liquid crystal layer between the pixel electrode and the counter electrode. When the switching element is turned off subsequent to the storage of charge, the charge is maintained in the liquid crystal layer if the resistance of the liquid crystal layer is high enough. If the amount of charge stored is controlled by driving each switching element, the liquid crystal changes the alignment state thereof from pixel to pixel, and required information is thus presented.

It suffices to store charge in the liquid crystal layer in each pixel during a portion of the time. First, a scanning line driving circuit successively selects scanning lines one by one. Second, a data line driving circuit outputs a sampling signal (pulse) to successively select one or a plurality of data lines at a time. Third, a video signal fed through a video signal line is sampled in response to the sampling signal, and is then fed to a corresponding data line. In this way, time-division multiplex driving is performed in which scanning lines and data lines are shared by a plurality of pixels.

If the sampling signals (pulses), which need to be output in an exclusive manner, overlaps each other in the output thereof for any reason, a video signal which is intended for a given data line happens to be sampled for an adjacent data line. Image quality is thus degraded. To resolve such an image degradation, a so-called enable circuit is arranged in an output stage of the data line driving circuit so that the pulse width of the sampling signal is narrowed to the pulse width of the enable pulse. The enable circuit prevents consecutive sampling signals from overlapping each other in time.

A video signal processor circuit generates a video signal by performing processes, such as a gamma correction and an amplification and inversion process, on an input video signal. The video signal processor and the liquid-crystal panel are connected to each other through an FPC (Flexible Printed Circuit), and the video signal is thus sent to the liquid-crystal panel through the FPC.

SUMMARY OF THE INVENTION

Since the pitch of wiring becomes finer in the liquid-crystal panel and the operation frequency of the liquid-crystal panel becomes higher along with a higher definition of a display screen, the delay of an enable pulse with respect to a video signal becomes a problem. The liquid-crystal panel is supplied with the enable signal, etc., via signal lines formed on a glass substrate. Since parasitic capacitance and resistance on the glass substrate are higher than those in the FPC, the liquid-crystal panel is subject to signal delay.

The enable pulse must be supplied in synchronization with the video signal. In the liquid-crystal panel, the supply route of the enable pulse and the supply route of the video signal are different. Even if the enable pulse synchronized with the video signal is fed to the liquid-crystal panel, therefore, the enable pulse is out of phase with the video signal in the liquid-crystal panel. The problem arises with a sampling signal for appropriately sampling the video signal.

The liquid-crystal panel is typically controlled by a variety of timing signals obtained through the digital process. The timing signal, which is a digital signal, includes a high-frequency component, and is synchronized with the video signal. For this reason, the timing signal contains a large amount of high-frequency components at the rising edge thereof and the falling edge thereof. Noise synchronized with the level shifting of the timing signal overlaps an analog video signal.

If noise is superimposed on the video signal, a voltage different from the original component thereof is sampled, and applied to the pixel electrode. Superimposed noise is then recognized as a vertical streak, thereby degrading image quality. Along with a compact design of the device, a step of controlling noise is an urgent need in view of a high-density circuit substrate and FPC substrate.

The present invention has been developed in view of the above problem, and it is an object of the present invention to provide a driving circuit for driving an electro-optical panel which generates an appropriate sampling signal and is free from degradation in image quality even if an enable pulse is out of phase with a video signal and even if noise is superimposed on the video signal, and to provide a method for driving the electro-optical panel, an electro-optical device, and electronic equipment.

A driving circuit of the present invention for driving an electro-optical panel having a transistor and a pixel electrode at each intersection of each of a plurality of scanning lines and each of a plurality of data lines, includes a scanning line driving circuit which selects a scanning line to supply a transistor corresponding to the selected scanning line with a signal to turn on the transistor, a data line driving circuit which generates a shift pulse to select a data line within a duration during which the scanning line is selected, and limits the pulse width of the shift pulse to the pulse width of an enable pulse narrower than the shift pulse width and outputs the shift pulse with the narrow pulse width as a sampling signal, a sampling circuit which samples a video signal within the pulse duration of the sampling signal and feeds the sampled signal to at least one data line, a dummy circuit which is arranged adjacent to the sampling circuit and the data line driving circuit, and outputs a phase difference signal representing a phase difference between a monitor signal supplied in synchronization with the video signal and a reference pulse supplied in synchronization with the enable pulse, and an enable pulse adjustment circuit which adjusts the phase of the enable pulse so that the phase of the enable pulse leads with respect to the video signal when the phase difference signal indicates that the reference pulse lags the monitor signal in phase, or so that the phase of the enable pulse lags with respect to the video signal when the phase difference signal indicates that the reference pulse leads the monitor signal in phase. When the reference signal synchronized with the enable pulse is delayed with respect to the monitor signal in this arrangement, the phase of the enable pulse is adjusted to cancel out the delay.

In the above driving circuit, the dummy circuit preferably includes an element identical to that which is also used in the sampling circuit and the data line driving circuit as portions thereof. In this arrangement, the delay occurring in the supply route of the enable pulse is accurately simulated.

Preferably, in the above driving circuit, the enable pulse adjustment circuit repeatedly alternates between delaying and advancing the enable pulse in phase within a predetermined range with respect to a target value. Since the phase of the enable signal fluctuates with respect to the target value in this arrangement, the phase of the sampling signal fluctuates accordingly. If the sampling signal fluctuates, noise is sampled sometimes, and is not sampled at other times. Noise is thus distributed on a screen, becoming less visible. The present invention prevents the quality of image for being degraded.

Preferably in the above driving circuit, the scanning line driving circuit, the data line driving circuit, the sampling circuit, and the dummy circuit are arranged on the same substrate.

Preferably, the driving circuit further includes a determining circuit which determines whether a constant duration of time elapses from the switching of power source, or determines whether a change in temperature of the electro-optical panel falls within a predetermined value, wherein the enable pulse adjustment circuit adjusts the phase of the enable pulse until the determination results provided by the determining circuit become affirmative, and when the determination results provided by the determining circuit become affirmative, the enable pulse adjustment circuit fixes the phase of the enable pulse to a phase immediately prior to the occurrence of the affirmative results. In this arrangement, the phase of the enable pulse is adjusted under certain conditions only.

Preferably in the driving circuit, the enable pulse adjustment circuit includes a group of delay circuits which outputs a plurality of signals different from each other in the amount of delay by delaying the reference clock signal synchronized with the video signal, a selection signal generator circuit which generates a selection signal to select one from among the plurality of signals output from the group of delay circuits, in accordance with the phase difference represented by the phase difference signal, a selector circuit which selects the one of the signals represented by the selection signals, from among the plurality of signals output from the group of delay circuits, as an enable clock signal, and an enable signal generator circuit which generates the enable pulse from a portion of the enable clock signal. In this arrangement, the phase of the enable pulse is adjusted by selecting one of the plurality of signals that are obtained by delaying the reference clock signal.

Preferably in the driving circuit, the selection signal generator circuit preferably generates the selection signal based on the results of comparison of the phase difference represented by the phase difference signal, namely, the phase lag of the reference pulse with respect to the monitor signal, with a predetermined target time. In this arrangement, the phase delay of the enable pulse with respect to the video signal is controlled to the target time.

In the driving circuit, the selection signal generator circuit preferably generates the selection signal every horizontal scanning period or every plurality of horizontal scanning periods. In this arrangement, the phase of the enable pulse is adjusted every horizontal scanning period or every plurality of horizontal scanning periods.

Preferably in the driving circuit, the phase difference signal is a pulse signal, the pulse width of which becomes shorter as the delay of the reference pulse becomes longer with respect to the monitor signal, the enable pulse adjustment circuit further includes a comparator circuit which compares the pulse width of the phase difference signal with a predetermined target time to determine which is longer, and the selection signal generator circuit generates the selection signal based on the comparison results provided by the comparator circuit, In this arrangement, the phase of the enable pulse is accurately adjusted.

Preferably in the driving circuit, the phase difference signal is a pulse signal, the pulse width of which becomes shorter as the delay of the reference pulse becomes longer with respect to the monitor signal, the group of delay circuits is composed of a plurality of delay circuits, each having a respective delay amount, connected in cascade, the enable pulse adjustment circuit further includes a comparator circuit which compares the pulse width of the phase difference signal with a predetermined target time to determine which is longer, and the selection signal generator circuit generates the selection signal for selecting a signal having a delay amount one notch longer from among the plurality of signals output from the group of delay circuits when the comparison results provided by the comparator circuit are affirmative, or generates the selection signal for selecting a signal having a delay amount one notch shorter from among the plurality of signals output from the group of delay circuits when the comparison results provided by the comparator circuit are non-affirmative. In this arrangement, the amount of delay of the enable pulse with respect to the monitor signal gradually becomes closer to the target time.

Preferably in the driving circuit, the enable pulse adjustment circuit further includes an adder which adds disturbance to the selection signal generated by the selection signal generator circuit, and the selector circuit selects a signal indicated by the selection signal to which disturbance is added by the adder, from among the plurality of signals output from the group of delay circuits. In this arrangement, the phase of the enable pulse fluctuates due to disturbance.

Preferably in the driving circuit, the selection signal generator circuit generates the selection signal for selecting a signal having a longer phase delay from among the plurality of signals output from the group of delay circuits when the phase difference represented by the phase difference signal, namely, the phase delay of the reference pulse with respect it the monitor signal falls within a constant value. In this arrangement, the phase of the enable pulse is forced to fluctuate.

Preferably in the driving circuit, the phase difference signal is a pulse signal, the pulse width of which becomes shorter as the delay of the reference pulse becomes longer with respect to the monitor signal, the group of delay circuits is composed of a plurality of delay circuits, each having a respective delay amount, connected in cascade, the enable pulse adjustment circuit further includes a comparator circuit which compares the pulse width of the phase difference signal with a predetermined target time to determine which is longer, and the selection signal generator circuit includes a detector circuit which detects whether or not previous comparison results provided by the comparator circuit coincide with current comparison results provided by the comparator circuit, and in case of coincident detection results between the previous and current comparison results, the selection signal generator circuit generates a selection signal for selecting a signal having a delay amount one notch longer from among the plurality of signals output from the group of delay circuits when the current comparison results are affirmative, or generates a selection signal for selecting a signal having a delay amount one notch shorter from among the plurality of signals output from the group of delay circuits when the current comparison results are not affirmative, or in case of non-coincident detection results between the previous and current comparison results, the selection signal generator circuit generates a selection signal for selecting a signal having a delay amount several notches longer from among the plurality of signals output from the group of delay circuits when the current comparison results are affirmative, or generates a selection signal for selecting a signal having a delay amount several notches shorter from among the plurality of signals output from the group of delay circuits when the current comparison results are not affirmative. This arrangement detects a change in a magnitude relationship, such as a change from phase lag to phase lead or a change from phase lead to phase lag. When a change is detected in the phase relation, the phase of the enable pulse is increased.

Preferably in the driving circuit, the data line driving circuit generates a shift pulse by shifting a start pulse fed during a blanking time in a horizontal scanning period in response to a clock signal controlling a shifting operation, and furthermore, the data line driving circuit includes a start pulse adjustment circuit which adjusts the phase of the start pulse in the same direction in and by substantially the same amount by which the phase of the enable pulse is adjusted by the enable pulse adjustment circuit, and a clock signal adjustment circuit which adjusts the phase of the clock signal in the same direction in and by substantially the same amount by which the phase of the enable pulse is adjusted by the enable pulse adjustment circuit. In this arrangement, not only the phase of the enable pulse but also the phases of the start pulse and the clock signal are equally adjusted.

In the arrangement in which both the start pulse and the clock signal are adjusted in phase, the start pulse is preferably used as the reference pulse. This arrangement eliminates the need for generating a new reference pulse. When the dummy circuit outputs the phase difference signal representing the phase difference between the start pulse supplied during a horizontal scanning period and the monitor signal, preferably the start pulse adjustment circuit adjusts the phase of the start pulse, based on the phase difference signal, during a horizontal scanning period after the first horizontal scanning period.

An electro-optical device of the present invention includes an electro-optical panel and a timing control circuit. The electro-optical panel includes a transistor at each intersection of each of a plurality of scanning lines and each of a plurality of data lines, a pixel electrode arranged corresponding to the transistor, a scanning line driving circuit which selects a scanning line to supply a transistor corresponding to the selected scanning line with a signal to turn on the transistor, a data line driving circuit which generates a shift pulse to select a data line, and limits the pulse width of the shift pulse to the pulse width of an enable pulse narrower than the shift pulse width and outputs the shift pulse with the narrow pulse width as a sampling signal, a sampling circuit which samples a video signal within the pulse duration of the sampling signal within a duration during which the scanning line is selected and feeds the sampled signal to one data line, a dummy circuit which is arranged adjacent to the sampling circuit and the data line driving circuit, and outputs a phase difference signal representing a phase difference between a monitor signal supplied in synchronization with the video signal and a reference pulse supplied in synchronization with the enable pulse. The timing control circuit includes an enable pulse adjustment circuit which adjusts the phase of the enable pulse so that the phase of the enable pulse leads with respect to the video signal when the phase difference signal indicates that the reference pulse lags the monitor signal in phase, or so that the phase of the enable pulse lags with respect to the video signal when the phase difference signal indicates that the reference pulse leads the monitor signal in phase. In this arrangement, as in the driving circuit, the phase of the enable pulse is adjusted to cancel a delay when the reference pulse synchronized with the enable pulse is delayed with respect to the monitor signal.

Preferably in the electro-optical device, in the electro-optical panel, the data lines are grouped into blocks, each block having n lines (n is an integer equal to or larger than 2), the video signal is divided into n signals, which are respectively fed to n video signal lines in parallel, and the sampling circuit samples the n video signals supplied in parallel to the n video signal lines in response to one sampling signal, and then feeds the sampled signals to a data lines on a one to one basis. In comparison with a construction in which a video signal is sampled to one video signal line by one sampling signal, this arrangement assures sufficient time for a sample and hold process and a discharge process.

Electronic equipment of the present invention includes one of the above-referenced electro-optical devices and presents an image. For example, the electronic equipment of the present invention may be a video projector, a mobile personal computer, a pager, a mobile telephone, a television, a view-finder type or a direct-monitoring type video camera, a car navigation device, a PDA, or the like.

A driving method of the present invention for driving an electro-optical panel having a transistor and a pixel electrode at each intersection of each of a plurality of scanning lines and each of a plurality of data lines, includes the steps of selecting a scanning line to supply a transistor corresponding to the selected scanning line with a signal to turn on the transistor, generating a shift pulse to select a data line within a duration during which the scanning line is selected and limiting the pulse width of the shift pulse to the pulse width of an enable pulse narrower than the shift pulse width and outputting the shift pulse with the narrow pulse width as a sampling signal, sampling a video signal within the pulse duration of the sampling signal and feeding the sampled signal to at least one data line, outputting a phase difference signal representing a phase difference between a monitor signal supplied in synchronization with the video signal and a reference pulse supplied in synchronization with the enable pulse, and adjusting the phase of the enable pulse so that the phase of the enable pulse leads with respect to the video signal when the phase difference signal indicates that the reference pulse lags the monitor signal in phase, or so that the phase of the enable pulse lags with respect to the video signal when the phase difference signal indicates that the reference pulse leads the monitor signal in phase. In this arrangement, as in the driving circuit and the electro-optical device, the phase of the enable pulse is adjusted to cancel a delay when the reference pulse synchronized with the enable pulse is delayed with respect to the monitor signal.

The driving method preferably includes the steps of outputting a plurality of signals different from each other in the amount of delay by delaying the reference clock signal synchronized with the video signal, generating a selection signal to select one from among the plurality of signals output from the group of delay circuits, in accordance with the phase difference represented by the phase difference signal, selecting the one of the signals represented by the selection signals, from among the plurality of signals output from the group of delay circuits, as an enable clock signal, and generating the enable pulse from a portion of the enable clock signal to adjust the enable pulse. In this method, the phase of the enable pulse is adjusted by selecting one of the plurality of signals that are obtained by delaying the reference clock signal.

Preferably in the driving method, the phase difference signal is a pulse signal, the pulse width of which becomes shorter as the delay of the reference pulse becomes longer with respect to the monitor signal. The driving method preferably includes the steps of comparing the pulse width of the phase difference signal with a predetermined target time to determine which is longer, and generating a selection signal for selecting a signal having a delay amount one notch longer from among the plurality of signals output from the group of delay circuits when the comparison results; are affirmative, or generating a selection signal for selecting a signal having a delay amount one notch shorter from among the plurality of signals output from the group of delay circuits when the comparison results are non-affirmative. In this method, the amount of delay of the enable pulse with respect to the monitor signal gradually becomes closer to the target time.

The driving method preferably includes the steps of adding disturbance to the generated selection signal, and selecting a signal indicated by the selection signal to which disturbance is added, from among the plurality of signals output from the group of delay circuits to adjust the enable pulse. In this method, the phase of the enable pulse is forced to fluctuate.

The driving method preferably includes a stop of generating the selection signal for selecting a signal having a longer phase delay from among the plurality of signals output from the group of delay circuits when the phase difference represented by the phase difference signal, namely, the phase delay of the reference pulse with respect to the monitor signal falls within a constant value. In this method, the phase of the enable pulse is forced to fluctuate.

In the driving method, the phase difference signal is a pulse signal, the pulse width of which becomes shorter as the delay of the reference pulse becomes longer with respect to the monitor signal. The driving method preferably includes the steps of comparing the pulse width of the phase difference signal with a predetermined target time to determine which is longer, and detecting whether or not previous comparison results coincide with current comparison results, and in case of coincident detection results between the previous and current comparison results, generating a selection signal for selecting a signal having a delay amount one notch longer from among the plurality of signals output from the group of delay circuits when the current comparison results are affirmative, or generating a selection signal for selecting a signal having a delay amount one notch shorter from among the plurality of signals output from the group of delay circuit when the current comparison results are not affirmative, or in case of non-coincident detection results between the previous and current comparison results, generating a selection signal for selecting a signal having a delay amount several notches longer from among the plurality of signals output from the group of delay circuits when the current comparison results are affirmative, or generating a selection signal for selecting a signal having a delay amount several notches shorter from among the plurality of signals output from the group of delay circuits when the current comparison results are not affirmative. This method detects an inversion in a magnitude relationship, such as a change from phase lag to phase lead or a change from phase lead to phase lag. When a change is detected in the phase relation, the phase of the enable pulse is increased.

Figure 1:
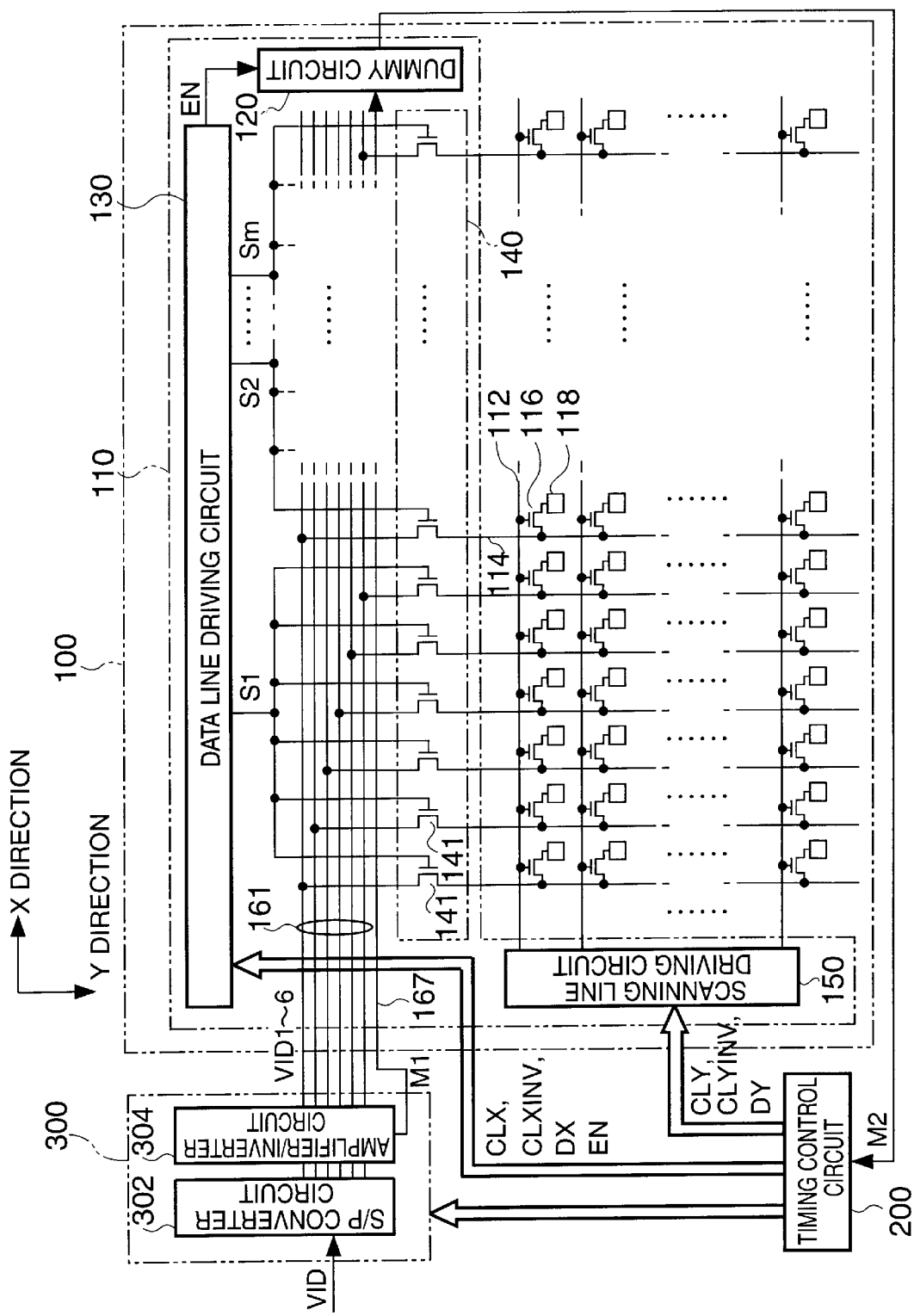
FIG. 1 is a block diagram generally illustrating the construction of the liquid-crystal display device in accordance with one embodiment of the present invention.

| [Reference Numerals] | |
|---|---|
| 100 | Liquid-crystal panel |
| 112 | Scanning line |
| 114 | Data line |
| 116 | TFT (transistor) |
| 120 | Dummy circuit |
| 130 | Data line driving circuit |
| 140 | Sampling circuit |
| 150 | Scanning line driving circuit |
| 200 | Timing control circuit |
| 202 | Group of delay circuits |
| 203 | Selector circuit |
| 204 | Enable signal generator circuit |
| 205 | Counter |
| 206 | Comparator circuit |
| 207 | Selection signal generator circuit |

DETAILED DESCRIPTION OF PREFERRED EMBODIMENTS

The embodiments of the present invention are discussed below with reference to the drawings.

<Electro-Optical Device>

A liquid-crystal display device as the electro-optical device of one embodiment of the present invention is discussed below. FIG. 1 is an electrical block diagram of tie liquid-crystal display device.

As shown, the liquid-crystal device includes a liquid-crystal panel 100, a timing control circuit 200, and a video signal processor circuit 300. The timing control circuit 200 generates a variety of timing signals (to be discussed in detail as necessary) synchronized with the video signal VID fed from outside and supplies these timing signals to blocks in the device.

An S/P converter circuit 302 forming the video signal processor circuit 300 distributes a single video signal VID to six lines while performing (serial-to-parallel) conversion to expand the video signal six times in time axis.

The video signal is serial-to-parallel converted into the six lines to prolong time during which the video signal is applied to the source of a TFT functioning as a sampling switch in a sampling circuit to be discussed later, thus to assure sufficient time for a sample and hold process and a charge/discharge process.

An amplifier/inverter circuit 304 inverts some of the serial-parallel converted video signals which need to be inverted, then appropriately amplifies the video signals, and feeds these video signals as VID1–VID6 to the liquid-crystal panel 100 through six video signal lines 161 in parallel.

Whether or not to invert the video signals is determined depending on the following conditions. Specifically, the voltage applied to each pixel electrode is inverted in polarity (1) every scanning line, (2) every data line, or (3) every pixel. The inversion period is thus set to one of one scanning period, one dot clock period, and one vertical scanning period. The polarity inversion in this embodiment refers to a voltage level inversion in which a voltage is alternately swung in the positive side and in the negative side with respect to the center level of the amplitude of the video signal.

The amplifier/inverter circuit 304 transfers a monitor signal M1 generated in the timing control circuit 200 to a monitor signal line 167 of the liquid-crystal panel 100. As will be discussed later, the monitor signal M1 remains active in level (at a high level) during a blanking time of each horizontal scanning period, and is used to compare the phase of the video signals VID1–VID6 with the phase of a sampling signal to be discussed later.

<Electrical Construction of the Liquid-Crystal Panel>

The electrical construction of the liquid-crystal panel 100 will be discussed below. The liquid-crystal panel 100 contains an element substrate and a counter substrate bonded to the element substrate with the electrode formation surfaces thereof facing each other. Referring to FIG. 1, a plurality of scanning lines 112 extend in parallel in the X direction and a plurality of data lines 114 extend in parallel in the Y direction perpendicular to the X direction on the element substrate. At each of the intersections (electrically insulated from each other) of these scanning lines 112 and data lines 114, a TFT 116 is configured with the gate thereof connected to the scanning line 112, with the source thereof connected to the data line 114, and with the drain thereof connected to a pixel electrode 118. Each pixel is formed of the pixel electrode 118, a common electrode formed on the counter substrate to be discussed later, and a liquid crystal encapsulated between the two electrodes. As a result, a matrix of pixels is formed at a matrix of intersections of the scanning lines 112 and data lines 114. Each pixel may contain a storage capacitance (not shown) electrically connected in parallel with the liquid crystal encapsulated between the pixel electrode 118 and the common electrode.

A peripheral circuit 110 includes a dummy circuit 120, a data line driving circuit 130, a sampling circuit 140, and a scanning line driving circuit 150. As will be discussed later, the peripheral circuit 110 is formed in the periphery surrounding a display area on the facing surface of the element substrate. Active elements on the periphery circuit 110 include p-channel type TFTs and n-channel TFTs in combination, and these TFTs are produced in the same manufacturing process in which the TFTs 116 contained in the display area are produced. Such a method provides advantages in terms of the degree of integration, manufacturing costs, and uniformity of the elements. Incidentally, a combination of the peripheral circuit 110 and a timing control circuit 200 to be discussed later form a driving circuit of the liquid-crystal display device.

The dummy circuit 120 in the peripheral circuit 110 is arranged adjacent to the data line driving circuit 130 and the sampling circuit 140, and simulates a portion of each of the two circuits 130 and 140. The dummy circuit 120 will be discussed in detail later, As will be discussed in detail later, the data line driving circuit 130 having a shift register shifts a start pulse DX from the timing control circuit 200 in response to an X clock signal CLX and an inverted X clock signal CLX INV, narrows the pulse width of the shifted pulses, and then outputs these pulses as sampling signals S1, S2, S3, . . . , Sm.

One scanning line is selected throughout one horizontal scanning period. A portion of the one scanning period throughout which the sampling signals S1, S2, S3, . . . , Sm are output may be called an effective horizontal scanning period, and the remaining portion of the one scanning period may be called a blanking time.

In this embodiment, the total number of the data lines 114 is 6m (m is an integer equal to or larger than 2), and six data lines 114 form one block. The number of blocks is m. The sampling circuit 140 is formed of n-channel TFT sampling switches 141 respectively arranged for the data line 114.

More specifically, among six data lines 114 belonging to a j-th block (j is 1, 2, . . . , m) from the left side, one end of the data line 114 at the first column from the left side is connected to the drain of the sampling switch 141. The sampling switch 141 is configured with the source thereof connected to a video signal line 161 with which the video signal VID1 is supplied, and with the gate thereof supplied with a sampling signal Sj. Ends of the data lines 114 at the second, third, . . . , sixth column of the six data lines 114 belonging to the j-th block are respectively connected to the drains of the sampling switches 141. The sampling switches 141 are configured with the sources thereof respectively connected to the video signal lines 161 to which video signals VID2, VID3, . . . , VID6 are respectively supplied, and the gates thereof commonly supplied with the sampling signal Sj.

For a duration within which the sampling signal Sj remains active in level (at a high level), the six sampling switches 141 in the j-th block are concurrently turned on, thereby sampling the respective video signals and supplying the respective data lines 141 with the video signals.

The response speed of the TFT changes depending on temperature and cumulative use time. The phases of the sampling signals S1, S2, S3, . . . , Sm sometimes lead and other times lag with respect to the video signals VID1–VID6. When phase differences are significant, the sampling signals S1, S2, S3, . . . , Sm respectively may become active in level at the timing at which the video signals VID1–VID6 change the levels thereof. The video signals VID1–VID6, which are to be supplied to (the date lines 114 of) the intended block, are also supplied to the adjacent block, thereby degrading image quality To avoid such a problem in this embodiment, the above-mentioned dummy circuit 120 detects the phase relationship of the video signals VID1–VID6 and the sampling signals S1, S2, S3, . . . , Sm based on the phase relationship between the reference pulse synchronized with the enable pulse controlling the sampling signals S1, S2, S3, . . . , Sm and the monitor signal M1 synchronized with the video signals VID1–VID6. In response to the detection results, the dummy circuit 120 adjusts the phase of the enable pulse, thereby adjusting the phase of the sampling signals S1, S2, S3, . . . , Sm with respect to the video signals VID1–VID6.

Like the data line driving circuit 130, the scanning line driving circuit 150 having a shift register shifts a start pulse DY from the timing control circuit 200 in response to a Y clock signal CLY or its inverted Y clock signal CLY INV, thereby supplying each scanning line 112 with a scanning signal to select one scanning line 112 every one horizontal scanning period. The start pulse DY becomes active in level for a constant period of time (for example, one period of the Y clock signal CLY) at the start of each vertical scanning period.

The liquid-crystal panel 100 includes a monitor signal line 167. The monitor signal line 167 extends in parallel with the six video signal lines 161 supplied with the video signals VID1–VID6 with the same spacing allowed along, and the monitor signal line 167 is equal to the video signal line 161 in line width.

Each of the six video signal lines 161 and the monitor signal line 167 has distributed resistance and capacitance, and therefore equivalently forms a ladder-type low-pass filter. For this reason, there is a delay time (delay amount) from when the video signals VID1–VID6 are fed to the input terminals on the left end of the liquid-crystal panel 100 to when the video signals VID1–VID6 reach the right end. Likewise, there is a delay time from when the monitor signal M1 is fed to the input terminal on the left end of the liquid-crystal panel 100 to when the monitor signal M1 reaches the dummy circuit 120. The video signal lines 161 and the monitor signal line 167 are identical in structure, and these lines have substantially the same delay.

The amount of delay of the video signals VID1–VID6 in the video signal line 161 is thus considered as identical to that of the monitor signal M1 in the monitor signal line 167.

<Construction of the Liquid-Crystal Panel>

Figure 2:
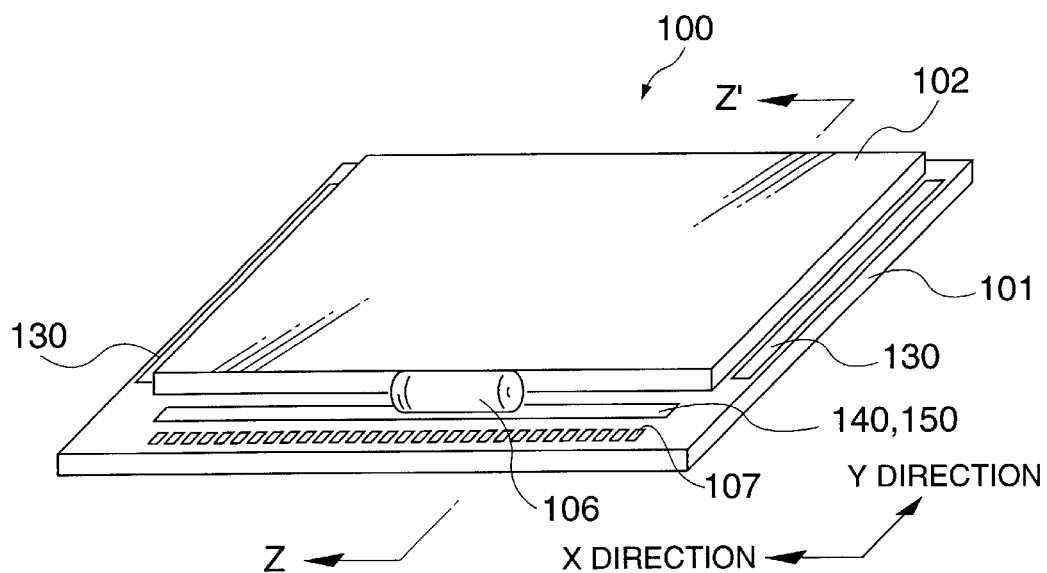
FIG. 2 is a perspective view illustrating the construction of a liquid-crystal panel of the liquid-crystal display device.
Figure 3:
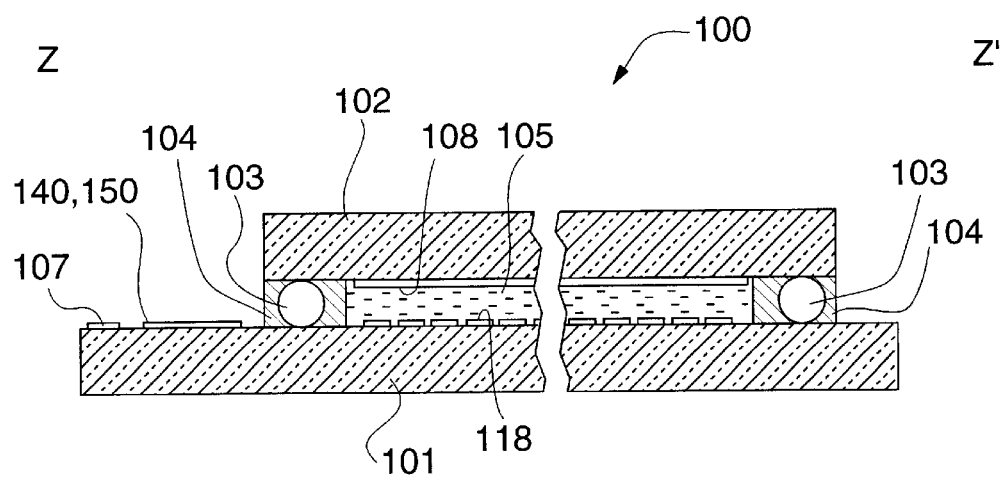
FIG. 3 is a cross-sectional view, partly broken away, of the liquid-crystal panel.

The construction of the above-mentioned liquid-crystal panel 100 is discussed below. FIG. 2 is a perspective view of the liquid-crystal panel 100, and FIG. 3 is a sectional view taken along line Z–Z' in FIG. 2.

As shown, the liquid-crystal panel 100 includes an element substrate 101 fabricated of glass or semiconductor and having the pixel electrodes 118, etc. thereon, and a transparent counter substrate 102 formed of glass or the like and having a common electrode 108, etc thereon. The element substrate 101 and the counter substrate 102 are bonded together with a sealing member 104 containing spacers 103 sandwiched therebetween so that the electrode formation surfaces thereof face each other. A liquid crystal 105 as an electro-optical material is encapsulated in the gap between the two substrates. The sealing member 104 is arranged along the periphery of the counter substrate 102, but has an opening through which the liquid crystal 105 is introduced. After encapsulating the liquid crystal 105, the opening is closed by a seal material 106.

The above-mentioned data line driving circuit 130 and sampling circuit 140 are arranged on one side external to the sealing member 104 of the facing surface of the element substrate 101, and drive the data lines 114 extending in the Y direction. A plurality of electrodes 107 are formed on this side, and receive a variety of signals from the timing control circuit 200 and the video signal processor circuit 300. Arranged on two sides perpendicular to the first side are two scanning line driving circuits 150, which drive the scanning lines 112 extending in the X direction from both sides. If the delay of the scanning signal fed to the scanning line 112 is not important a single scanning line driving circuit 150 may be arranged on one side only as shown in FIG. 1.

A precharge circuit may be arranged to precharge each data line 114 at timing prior to the timing of the video signal, and thus to lighten load involved in the writing of the video signal to the data line 114.

The common electrode 108 on the counter substrate 102 is electrically connected in at least one of the electrodes 107 formed on the element substrate 101 through a conductor arranged at least one of the four corners of a bonded portion of the counter substrate 102 with the element substrate 101. By applying a constant voltage to the electrode 107, the common electrode 108 formed on the counter substrate 101 is kept to the constant voltage.

Arranged on the counter substrate 102 is first, a color filter having a striped configuration, a mosaic configuration, or a triangle configuration, second, a black matrix such as a resin black which is produced by dispersing, in a photoresist, a metal material such as chromium or nickel, or carbon or titanium, and third, a backlight for illuminating the liquid-crystal panel 100. As will be discussed later, a projection, which uses color light modulation, does not contain a color filter on the counter substrate 102. Instead, to improve light transmittance through the pixel, a microlens may be employed for each pixel.

An alignment layer, which is subjected to a rubbing process in a predetermined direction, is arranged on the facing surface of each of the element substrate lot and the counter substrate 102. Arranged on the external surface of each of the element substrate 101 and the counter substrate 102 is a polarizer (not shown) in accordance with the respective alignment direction. The use of a polymer-dispersed liquid crystal with liquid-crystal particles dispersed in a polymer as the liquid crystal 105 eliminates the alignment layer and the polarizer, thereby increasing the utilization of light, and being advantageous in terms of brightness and power saving.

Instead of forming the peripheral circuit 110 in whole or in part on the periphery of the clement substrate 101, an IC chip mounted on the film using the TAB (Tape Autonated Bonding) technique may be electrically and mechanically connected to the electrodes formed on the element substrate 101 through an electrically an isotropic film. The IC chip itself may he electrically and mechanically connected to the electrodes formed on the element substrate 101 using the COG (Chip On Grass) technique through an electrically anisotropic film.

<Data Line Driving Circuit>

Figure 4:
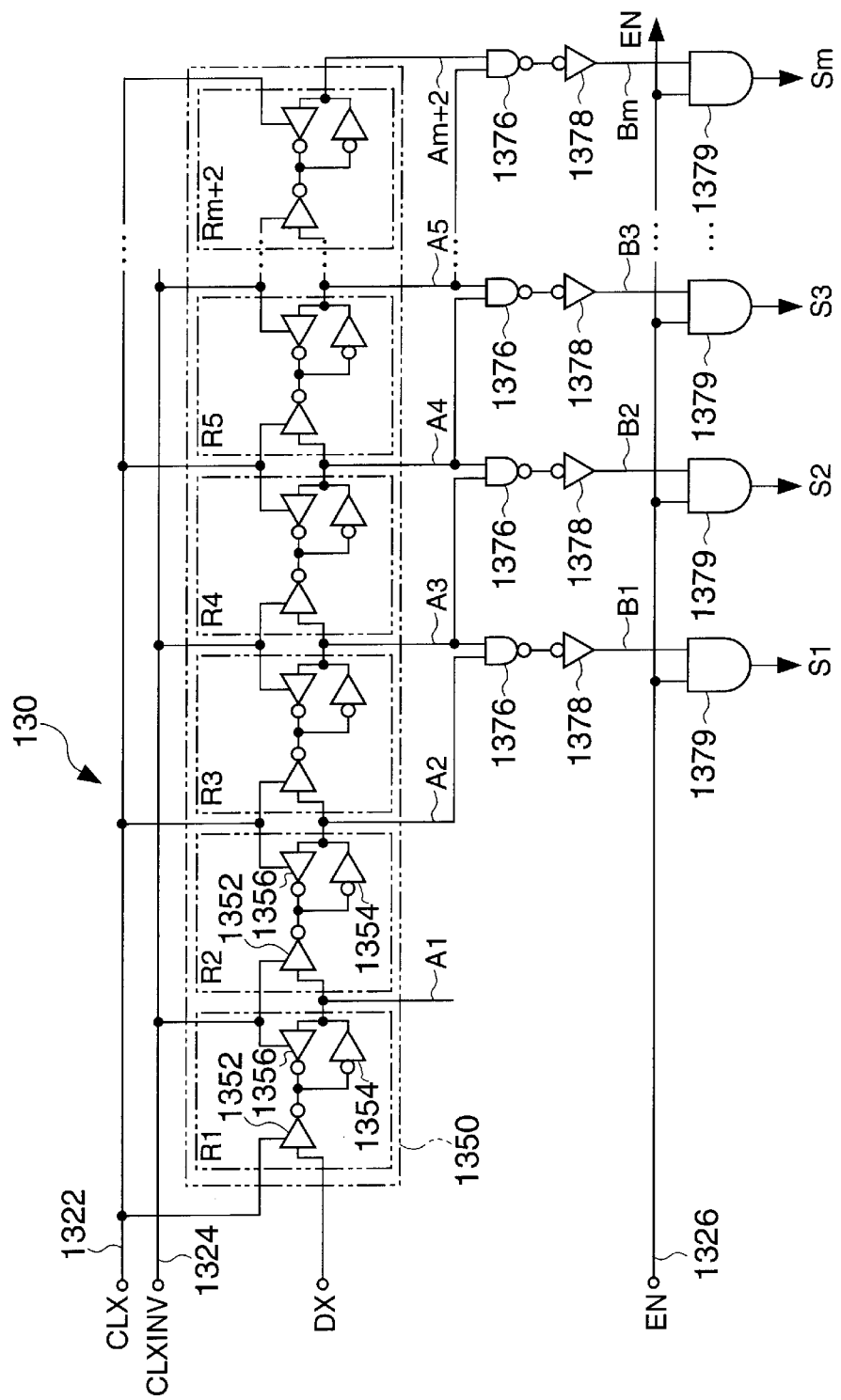
FIG. 4 is a circuit diagram illustrating the construction of a data line driving circuit in the liquid-crystal display device.

Each section of the peripheral circuit 110 formed in the liquid-crystal panel 100 is discussed below. FIG. 4 is a circuit diagram illustrating the construction of the data line driving circuit 130 in the peripheral circuit 110.

As shown, a shift register 1350 includes cascaded (m+2) stages of unit circuits R1, R2, R3, . . . , Rm, Rm+1, and Rm+2. The shift register 1350 successively shifts the start pulse DX supplied at the start of the horizontal scanning period from the front stage (on the left-hand side) to the back stage (on the right-hand side) in response to the X clock signal CLX supplied through a signal line 1322 (and the inverted X clock signal CLX INV supplied through a signal line 1324). The start pulse DX remains active during a constant duration (one period of the X clock signal CLX, for example) at the beginning of each horizontal scanning period.

For convenience, let m represent an odd number. Each of the odd-numbered unit circuits R1, R3, . . . , Rm+2 includes a clocked inverter 1352 that inverts the input signal thereto when the X clock signal CLX remains at a high level (when the inverted X clock signal CLX INV remains at a low level), an inverter 1354 that re-inverts the signal inverted by the clocked inverter 1352, and a clocked inverter 1356 that inverts the input thereto when the X clock signal CLX remains at a low level (when the inverted Y clock signal CLY INV remains at a high level).

Each of the even-numbered unit circuits R2, R4, . . . , Rm+1 is basically identical to each of the odd-numbered unit circuits R1, R3, . . . , Rm+2 except that the clocked inverter 1352 inverts the input signal thereto when the X clock signal CLX remains at a low level and except that the clocked inverter 1356 inverts the input signal thereto when the X clock signal CLX remains at a high level.

Referring to FIG. 4, an NAND gate 1376, an inverter 1378, and an AND gate 1379 are arranged for each of the shift register 1350 at the third stage to the (m+2)-th stage. Each of these is fabricated of a complementary type in which a p-channel TFT and an n-channel TFT are combined.

In the shift register 1350, the NAND gate 1376 arranged for the unit circuit at a given stage NAND-gates the output signal of that stage and the output signal from the immediately prior stage. For example, the NAND gate 1376 arranged for the unit circuit R4 at the fourth stage NAND-gates the output signal A4 from the unit circuit R4 at the fourth stages and the output signal A3 from the unit circuit R3 at the immediately prior stage.

Each inverter 1378 inverts the NAND output from the corresponding NAND gate 1376. The AND gate 1379 AND-gates the output signal output from the corresponding inverter 1378 arid the enable signal EN supplied through the signal line 1326, and outputs the AND output signal as a sampling signal. The AND gates 1379 at the third stage through the (m+2)-th stage output the sampling signals S1, S2, S3, . . . , Sm.

Figure 5:
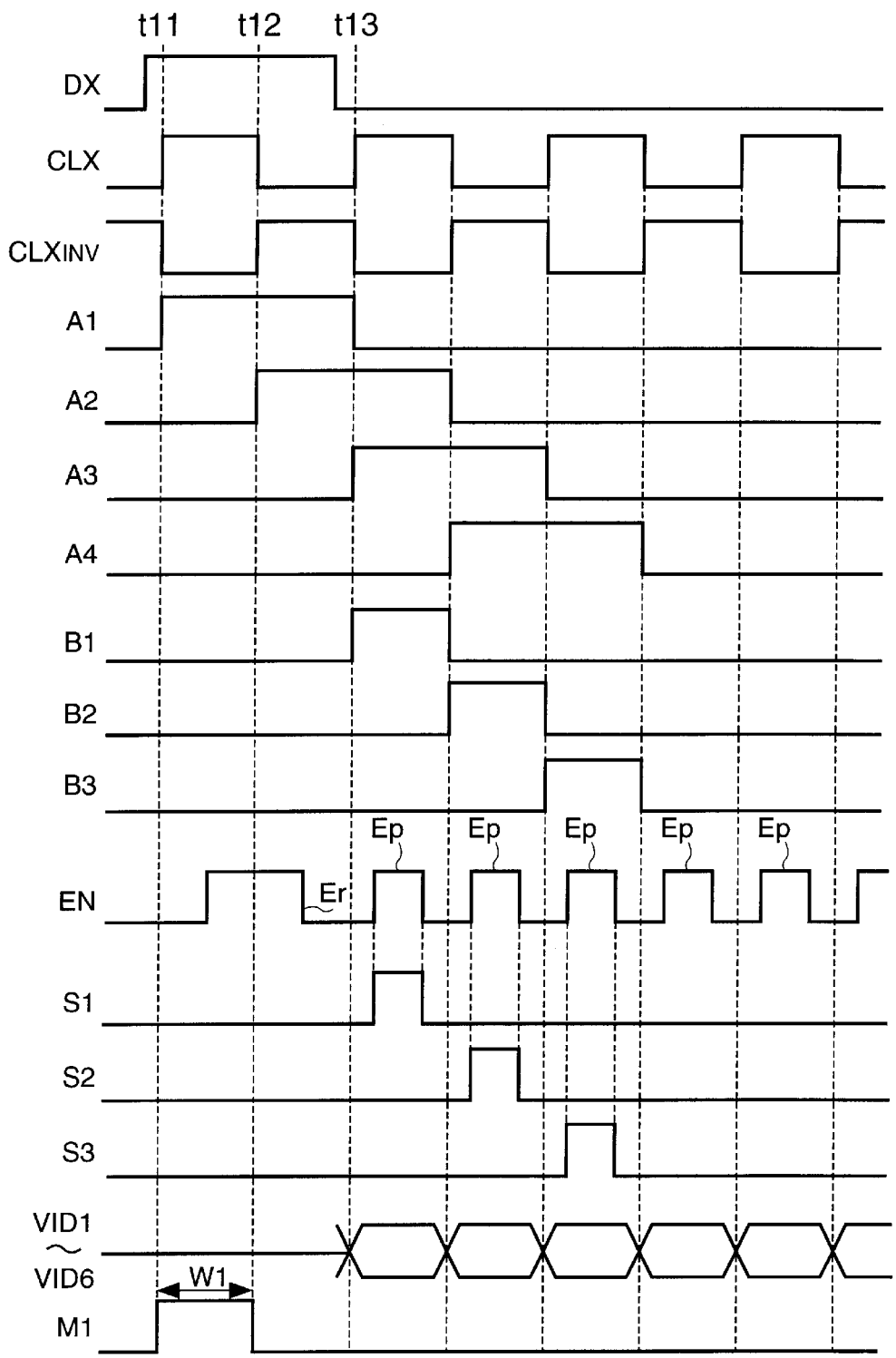
FIG. 5 is a timing diagram illustrating the operation of the data line driving circuit.

FIG. 5 is a timing diagram illustrating the operation of the data line driving circuit 130. Within the blanking time of the horizontal, scanning period, the start pulse DX is input, and the X clock signal CLX rises (the inverted X clock signal CLX INV rises) at the timing t11. The clocked inverter 1352 at the unit circuit R1 at the first stage in the shift register 1350 inverts the high level of the start pulse DX, and the inverter 1354 at the unit circuit R1 at the first stage re-inverts the signal inverted by the clocked inverter 1352. The output signal A from the unit circuit R1 at the first stage is transitioned to a high level.

When the X clock signal CLX falls (the inverted X clock signal CLX INV rises) at timing t12 within the duration of the start pulse DX, the clocked inverter 1356 at the unit circuit R1 at the first stage inverts and then feeds back the high level output signal A to the inverter 1354. The high level of the output signal A is thus maintained. The clocked inverter 1352 at the unit circuit R2 at the second stage inverts the high level of the output signal A1 from the unit circuit R1 at the first stage, and the inverter 1354 at the unit circuit R2 at the second stage re-inverts the signal inverted by the clocked inverter 1352. The output signal A2 from the unit circuit R2 at the second stage becomes high in level.

When the X clock signal CLX rises again (the inverted X clock signal CLX INV falls again) at timing t13 after the end of the input of the start pulse DX, the clocked inverter 1352 at the unit circuit R1 at the first stage captures the low level of the start pulse DX, and the output signal A1 of the unit circuit R1 is transitioned to a low level. On the other hand, the clocked inverter 1356 at the unit circuit R2 at the second stage inverts and then feeds back the high level output signal B to the inverter 1354. The output signal A2 is kept to a high level. The clocked inverter 1352 at the unit circuit R3 at the third stage inverts the high level of the output signal A2 from the unit circuit R2 at the second stage, and the inverter 1354 at the unit circuit R2 at the second stage re-inverts the signal inverted by the clocked inverter 1352, and the output signal A3 from the unit circuit R3 at the third stage becomes high in level.

Since the above operation is repeated, the start pulse DX input first is successively shifted by half the period of the X clock signal CLX (the inverted X clock signal CLX INV), and provides output signals A1, A2, A3, . . . , Am+2 from the unit circuits R1, R2, R3, . . . , Rm+2. The output signals A3, A4, . . . , Am+2 and the respective output signals immediately prior stages are NAND-gated by the respective NAND gates 1376, and the NAND gate outputs are inverted by the respective inverters 1378. As a result, the inverters 1378 respectively output signals B1, B2, B3, . . . , Bm.

As shown, the enable signal EN is formed of a reference pulse Er and an enable pulse Ep. Since the reference pulse Er remains at an active level for a ½ period of the clock signal CLX during a portion of the blanking time in one horizontal scanning period. The enable pulse Ep remains at an active level (high level) during a portion of the active level period of each of the; signals B1, B2, B3, . . . , Bm.

The AND output signal from each AND gate 1379, namely, the sampling signals S1, S2, S3, . . . , Sm are produced by limiting the pulse width of the signals B1, B2, B3, ..., Bm to the pulse width W of the enable pulse Ep.

The reference pulse Er and the enable pulse Ep, forming the enable signal EN, are produced based on the enable clock signal CLKe to be described later, and these pulses are synchronized with each other.

The X clock signal CLX is synchronized with the video signals VID1-VID6. This is because the timing control circuit 200 (see FIG. 1) supplies the S/P converter circuit 302 with a timing signal for serial-to-parallel converting the video signal VID in synchronization with the rising timing and the falling timing of the X clock signal CLX. The voltage levels of the video signals VID1–VID6 change at a timing at which the, X clock signal CLX is transitioned in level.

The video signals VID1–VID6 are thus sampled at timings at which the sampling signals S1, S2, S3, ..., Sm are transitioned to an active level (a high level).

In the actual circuit, the video signal line 161 equivalently forms a ladder-type low-pass filter. The video signals VID1–VID6 are delayed. The signal line 1326 also equivalently forms a ladder-type low-pass filter in the data line driving circuit 130. The enable signal EN is also delayed.

<Dummy Circuit>

Figure 6:
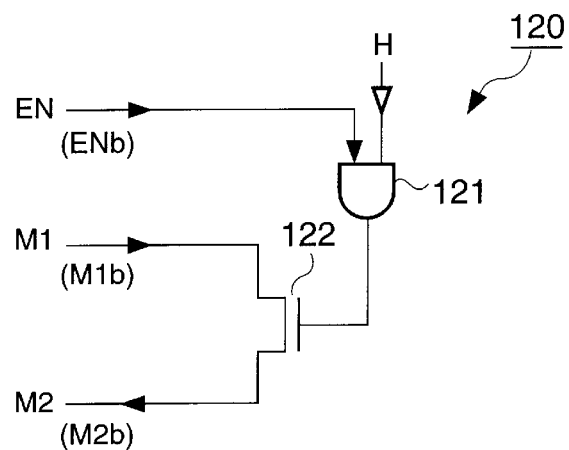
FIG. 6 is a block diagram illustrating a dummy circuit in the liquid-crystal display device.

The dummy circuit 120 is discussed below in detail. FIG. 6 is a circuit diagram of the dummy circuit 120. The dummy circuit 120 includes an AND gate 121 and an n-channel TFT 122. The AND gate 121 has the same construction as that of the AND gate 1379 used in the data line driving circuit 130 illustrated in FIG. 4. The TFT 122 has the same construction as that of the sampling switch 141 in the sampling circuit 140 illustrated in FIG. 1. The AND gate 121 receives the enable signal EN at one input through the data line driving circuit 130 while continuously receiving at the other input a high level signal. The output signal of the AND gate 121 is the one that is obtained by delaying the enable signal EN.

The enable signal EN input to the one input of the AND gate 121 is delayed by the signal line 1326, and the AND gate 121 has the same construction, as that of the AND gate 1379. The output signal of the AND gate 121 is subject to substantially the same amount of delay as that of the sampling signals S1, S2, S3, ..., Sm through the data line driving circuit 130.

Next, the output of the AND gate 121 is fed to the gate of the TFT 122, and the monitor signal M1 is fed to the source of the TFT 122. The TFT 122 outputs a phase difference signal M2 from the, drain thereof. Since the TFT 122 is of an n-channel type, the phase difference signal M2 is transitioned to a high level when both the monitor signal M1 and the enable signal EN are both at a high level.

The monitor signal M1 fed to the source of the TFT 122 is delayed through the signal line 167, and the amount of delay is substantially equal to that of the delay of the video signal fed through the video signal line 161 as already discussed, Also as already discussed, the output signal of the AND gate 121 is delayed by substantially the same amount as that to which the sampling signals S1, S2, S3, ..., Sm are subject.

The phase difference signal M2 thus contains information representing the phase difference of the sampling signals S1, S2, S3, ..., Sm with respect to the video signals VID1–VID6 fed to the liquid-crystal panel 100.

As shown in FIG. 5, the monitor signal M1 remains at a high level throughout a duration during which the X clock signal CLX remains at a high level within the blanking time. As already discussed, the enable signal EN contains the reference pulse Er and the enable pulse Ep, and only the reference pulse Er is present within the blanking time. The phase difference signal M2 thus represents the phase relationship between the reference pulse Er and the monitor signal M1.

Figure 7:
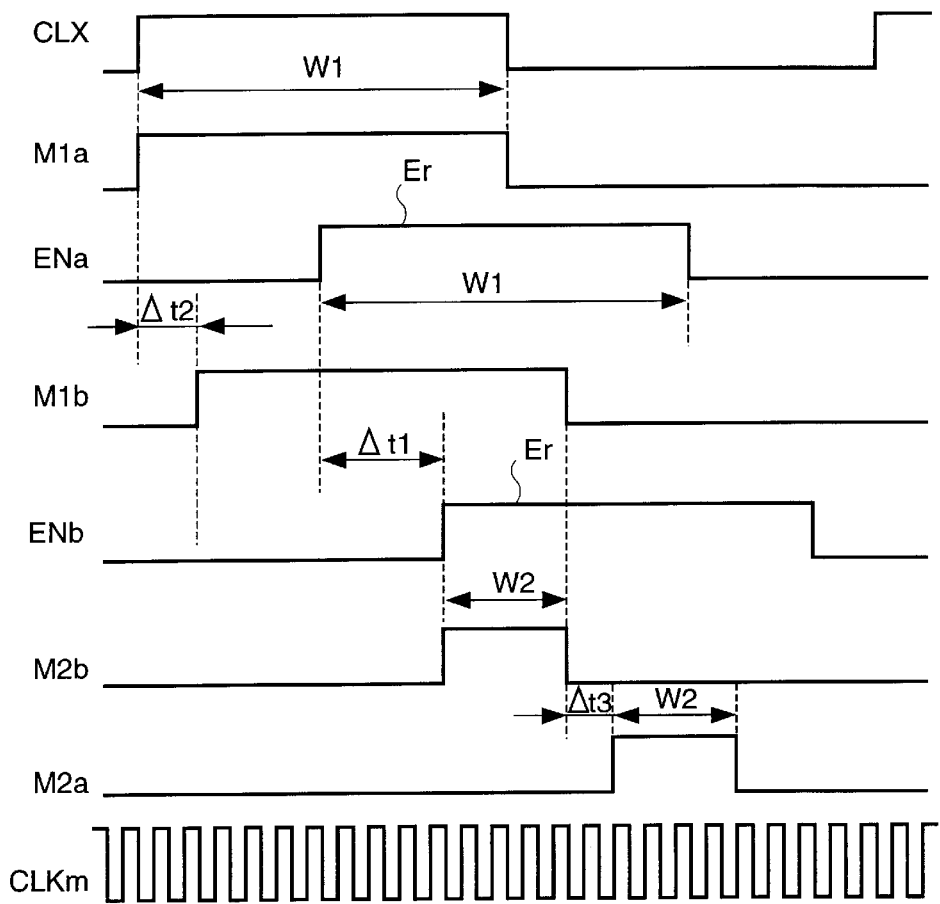
FIG. 7 is a timing diagram illustrating the operation of the dummy circuit.

FIG. 7 is a timing diagram illustrating the waveforms of signals in the dummy circuit 120 and the peripheral portions thereof As shown, M1a shows the waveform of the monitor signal M1 output from the amplifier/inverter circuit 304, and M1b shows the waveform of the monitor signal M1 input to the dummy circuit 120. Likewise, ENa shows the waveform of the enable signal EN output from the timing control circuit 200, and ENb shows the waveform of the enable signal EN input to the dummy circuit 120. M2b shows the waveform of the phase difference signal M2 output from the dummy circuit 120, and a M2a shows the waveform of the phase difference signal M2 input to the timing control circuit 200.

Referring to FIG. 7, the enable signal ENb input to the dummy circuit 120 is delayed from the enable signal ENa output from the timing control circuit 200 by time Δt1. The monitor signal M1b input to the dummy circuit 120 is delayed from the monitor signal M1a output from the amplifier/inverter circuit 304 by time Δt2.

The reason why delay times Δt1 and Δt2 are different from each other is that the signal line 1326 and the monitor signal line 167 are different as signal paths leading to the dummy circuit 120.

The dummy circuit 120 needs to generate the phase difference signal M2b in this embodiment to detect the phase relationship of the video signals VID1–VTD6 and the sampling signals S1, S2, S3, ..., Sm in the actual circuit.

The pulse width W2 of the phase difference signal M2b is time from the rising edge of the reference pulse Er forming the enable signal ENb to the rising edge of the monitor signal M1b. The reference pulse Er and the monitor signal M1b are fixed to the same pulse width W1. A duration of time that is obtained by subtracting the pulse width W2 of the phase difference signal M2b from the pulse width W1 represents a phase difference between the enable signal ENb and the monitor signal M1b. The longer the phase difference, the shorter the pulse width W2 becomes. The shorter the phase difference, the longer the pulse width W2 becomes. The phase difference therebetween is thus known from the phase difference signal M2b.

In this embodiment, there occurs a delay time of Δt3 from when the phase difference signal M2b is output from the dummy circuit 120 to when the phase difference signal M2a is input to the timing control circuit 200. Since the phase difference signal M2b is equal to the phase difference signal M2a in pulse width, the timing control circuit 200 precisely determines the phase relationship between the video signals VID1–VID6 and the sampling signals S1, S2, S3, ..., Sm from the phase difference signal M2a.

<Timing Control Circuit>

Figure 8:
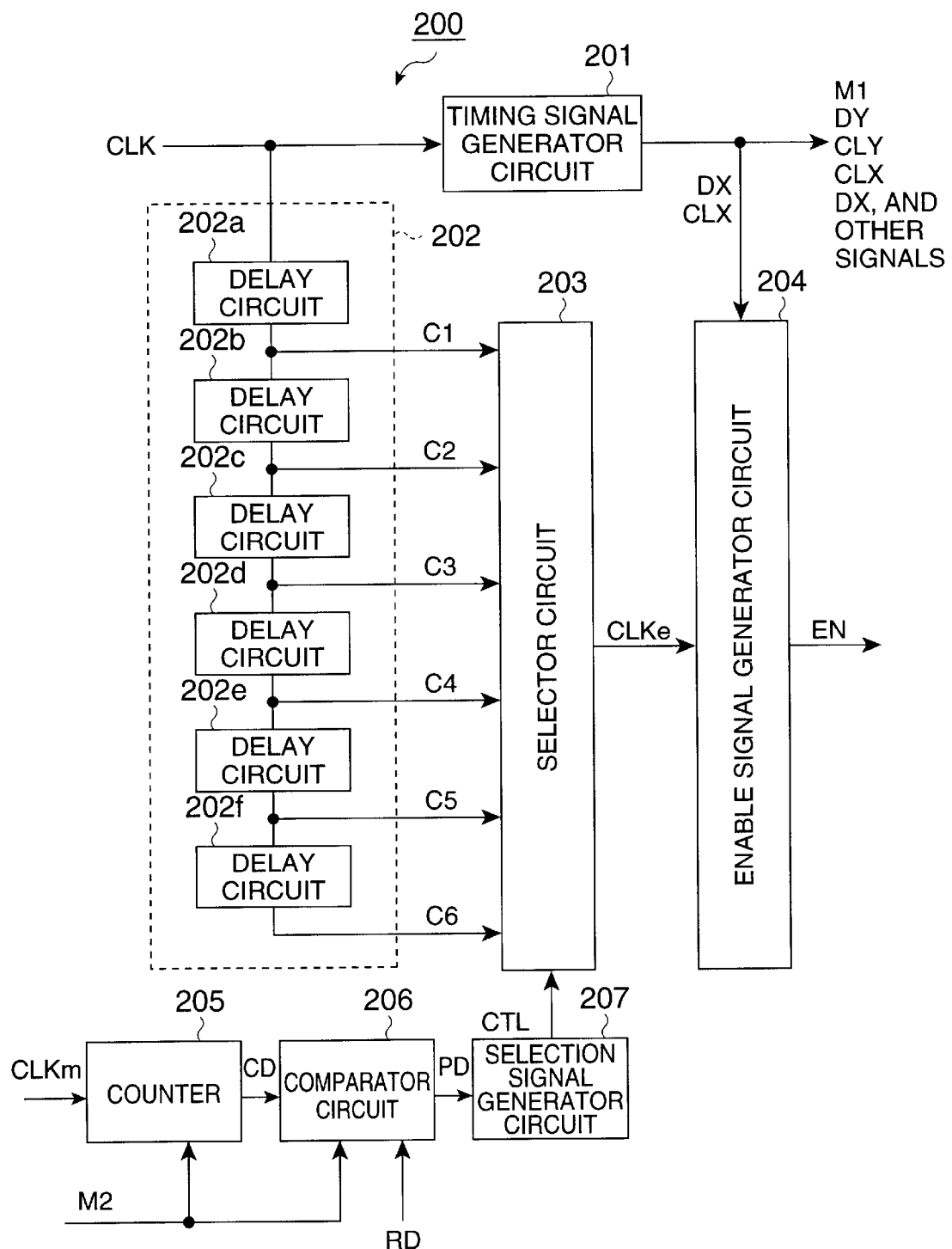
FIG. 8 is a block diagram illustrating the construction of a timing control circuit in the liquid-crystal display device.

The timing control circuit 200 is discussed below. FIG. 8 is a block diagram illustrating the construction of the timing control circuit 200. As shown, the timing control circuit 200 includes a timing signal generator circuit 201, a group of delay circuits 202, a selector circuit 203, an enable signal generator circuit 204, a counter 205, a comparator circuit 206, and a selection signal generator circuit 207.

This arrangement includes no component for controlling the video signal processor circuit 300. The arrangement shown in FIG. 8, less timing signal generator circuit 201, forms an enable pulse adjustment circuit.

Referring to FIG. 8, the timing signal generator circuit 201 generates the reference clock signal CLK generated in synchronization with the video signal VID from outside, or the start pulse DY, the Y clock signal CLY, the start pulse DX, the X clock signal CLX, and the monitor signal M1 in response to the reference clock signal CLK generated in synchronization with the video signal VID input from outside. The X clock signal CLX has half the frequency of the reference clock signal CLK.

The group of delay circuits 202 includes six delay circuits 202a–202f connected in cascade, and successively outputs C1–C6 which are obtained by successively delaying the reference clock signal CLK. Each of the delay circuits 202a–202f is produced by connecting an even number of inverters.

Figure 9:
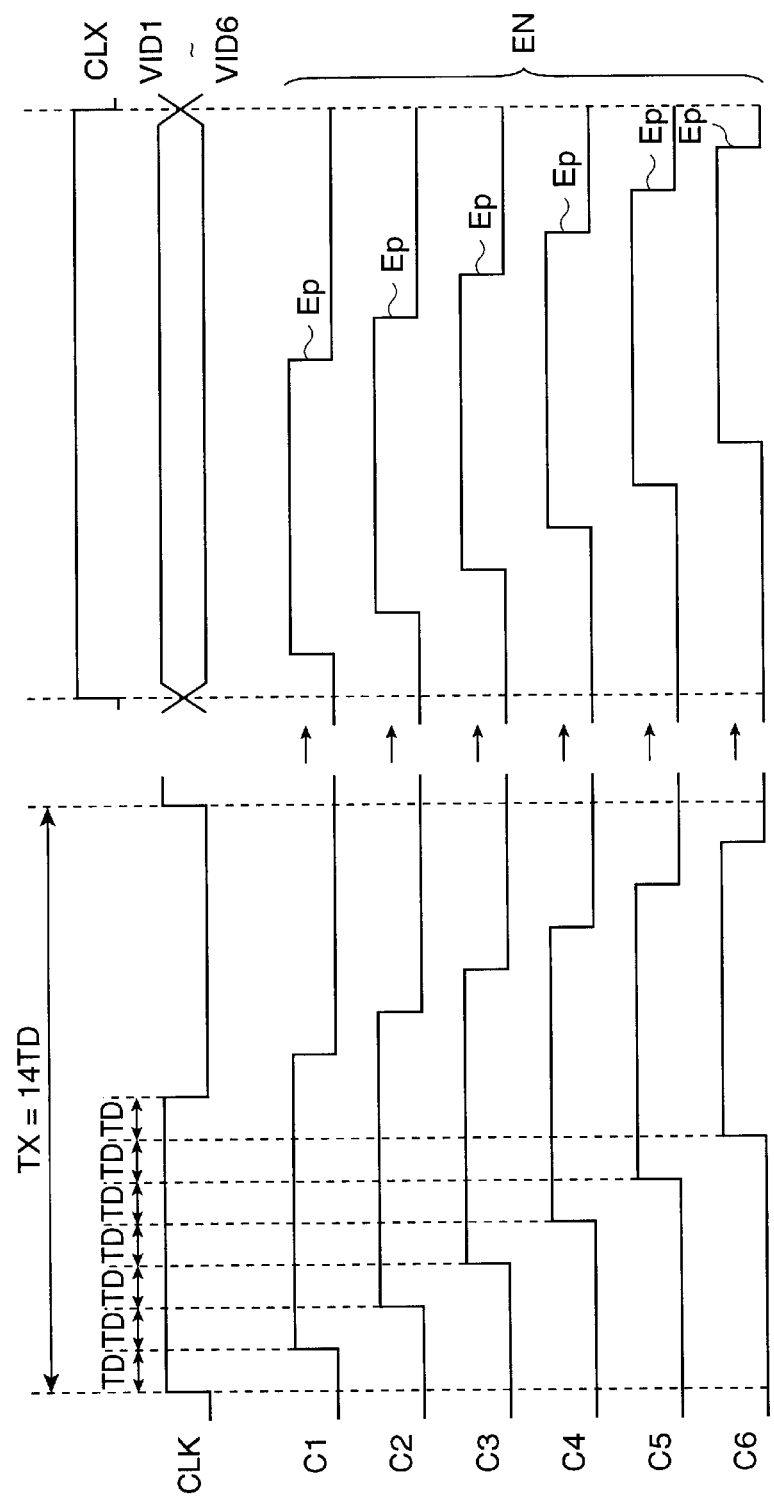
FIG. 9 is a timing diagram illustrating a delay operation of a delay circuit in the timing control circuit.

For convenience of explanation, the following conditions are set up. Specifically, as shown in FIG. 9, one period of the reference clock signal CLK is represented by TX, the pulse width of the enable pulse Ep is half the X clock signal CLK, the same time delay provided by each of the delay circuits 202a–202f is represented by TD, and the relationship of TX=14TDs holds. Under these conditions, the signals C1, C2, C3, . . . , C6 are produced by respectively delaying the reference clock signal CLK by the time TD, twice the time TD, three times the time TD, . . . , six times the time TD.

As will be discussed later, the selector circuit 203 selects one of the signals C1, C2, C3, . . . , C6 designated by a 3 bit selection signal CTL within the horizontal scanning period in which the phase difference signal M2 falls, and outputs the selection signal as the enable clock signal CLKe.

Figure 10:
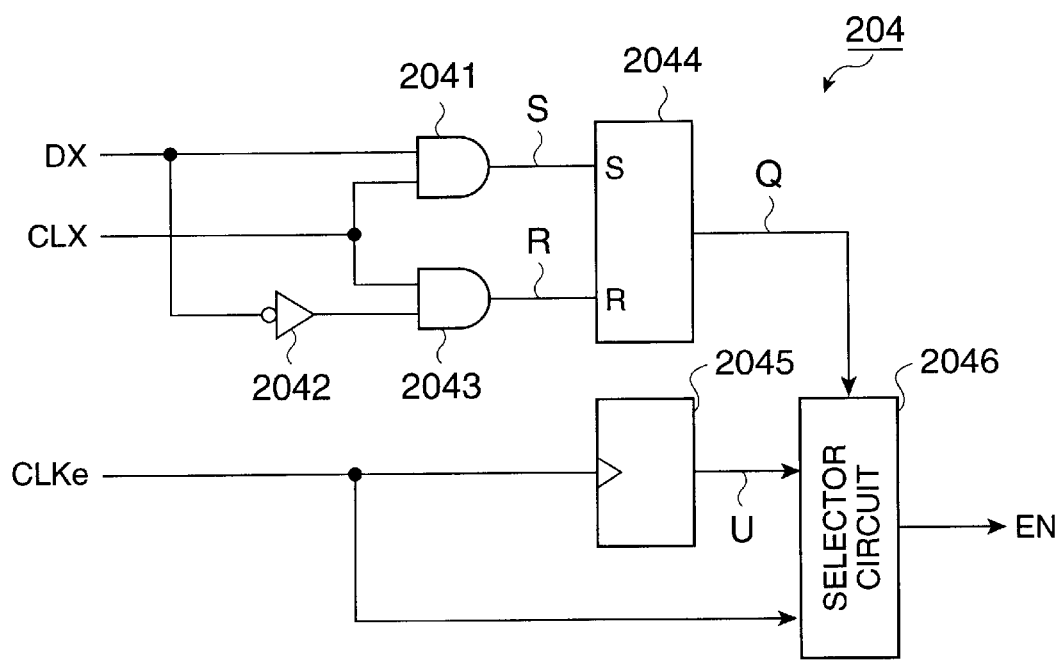
FIG. 10 is a block diagram illustrating the construction of an enable signal generator circuit in the timing control circuit.

The enable signal generator circuit 204 generates the enable signal EN composed of the reference pulse Er and the enable pulse Ep from the enable clock signal CLKe. FIG. 10 illustrates the enable signal generator circuit 204 in detail.

Referring to FIG. 10, an AND circuit 2041 outputs an AND gate output signal S of the start pulse DX and the X clock signal CLX. An AND gate 2043 outputs an AND gate output signal R of the inverted start pulse DX from a NOT gate 2042 and the X clock signal CLX. A flipflop 2044 sets the output signal Q in response to the signal S, and resets the output signal Q in response to the signal R.

Figure 11:
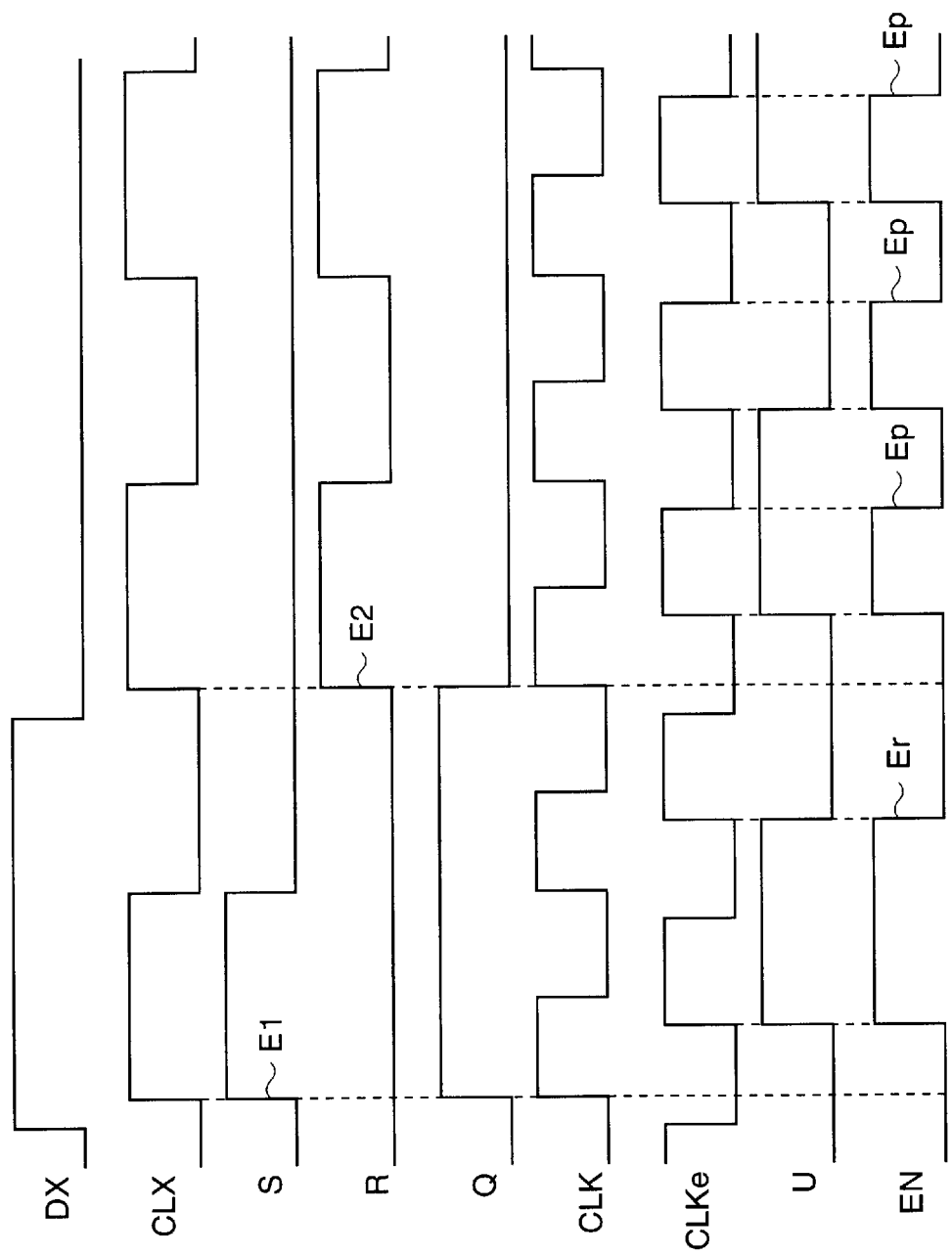
FIG. 11 is a timing diagram illustrating the waveform of each block in the enable signal generator circuit.

Referring to FIG. 11, at timing E1 at which both the start pulse DX supplied within the blanking time and the X clock signal CLX are transitioned to a high level, the signal S rises to a high level. At timing E2 at which the X clock signal CLX first rises to a high level after the start pulse DX is transitioned to a low level, the signal R is transitioned to a high level.

The signal Q is set to a high level at timing E1, and is then set to a low level at timing E2.

A flipflop 2045 is a toggle type, and generates a signal U by dividing the enable clock signal CLKe by two. In response to a logical level of the signal Q, a selector circuit 2046 selects between the signal U and the enable clock signal CLKe and outputs the selected signal as the enable signal EN. Specifically, the selector circuit 2046 selects the frequency divided signal U of the enable clock signal CLKe when the signal Q is at a high level, and selects the enable clock signal CLKe itself when the signal Q is at a low level. The selector circuit 2046 outputs the selected signal as the enable signal EN.

In other words, when the signal Q is at a high level, (a high level portion of) the frequency divided signal U selected by the selector circuit 2046 is used as the reference pulse Er, and when the signal Q is at a low level, (a high level portion of) the enable clock signal CLKe is used as the enable pulse Ep.

As discussed above, the frequency of the X clock signal CLX has half the frequency of the reference clock signal CLK. The enable clock signal CLKe, which is selected during the low level of the signal Q, is the one selected from the signals C1–C6 in response to the selection signal CTL. The enable pulse Ep when each of the signals C1–C6 is selected is related as shown in FIG. 9 (on the right portion thereof). By appropriately selecting the C1–C6, the phase of the enable pulse Ep is adjusted with respect to the video signals VID1–VID6.

Returning to FIG. 8, the counter 205 for generating the selection signal CTL, the comparator circuit 206 and the selection signal generator circuit 207 are discussed below.

The counter 205 counts a monitor clock signal CLKm when the phase difference signal M2 is at a high level, and then outputs the count thereof as count data CD. One period of the monitor clock signal CLKm is set to be sufficiently shorter than the delay time TD. Referencing the count data CD, a duration during which the phase difference signal M2 is at a high level is indicated.

The comparator circuit 206 compares the count data CD with reference data RD, thereby generating a comparison signal PD. The comparison signal PD rises to a high level with the condition CD≧RD holding, and falls to a low level with the condition CD<RD holding.

The reference data RD is a value representing how many periods of the monitor clock signal CLKm correspond to half the period W1 throughout which the monitor signal MI remains at a high level. As shown in FIG. 5, when the reference pulse Er is delayed from the monitor signal M1 by half the period W1, the value of the count data CD equals the value of the reference data RD.

Under these conditions, the enable pulse Ep is adjusted to be positioned at the center of the active period of the video signals VID1–VID6. Based on the phase relationship, the enable pulse Ep lags with the condition CD≧RD holding, the enable pulse Ep leads with the condition CD<RD holding.

The selection signal generator circuit 207 generates the selection signal CTL based on the phase difference signal M2 and the comparison signal PD. Specifically, the selection signal generator circuit 207 first determines the logical level of the comparison signal PD at the timing at which the phase difference signal M2 falls, and second generates the selection signal CTL for designating the selection of a signal one notch phase delayed when the comparison signal PD is at a high level, or generates the selection signal CTL for designating the selection of a signal one notch phase advanced when the comparison signal PD is at a low level. For example, when the selection signal CTL designates the selection of the signal C3, the selection signal generator circuit 207 generates the selection signal CTL for designating the selection of the signal C4 which is one notch delayed from the phase of the signal C3 at the moment the comparison signal PD is transitioned to a high level.

Figure 12:
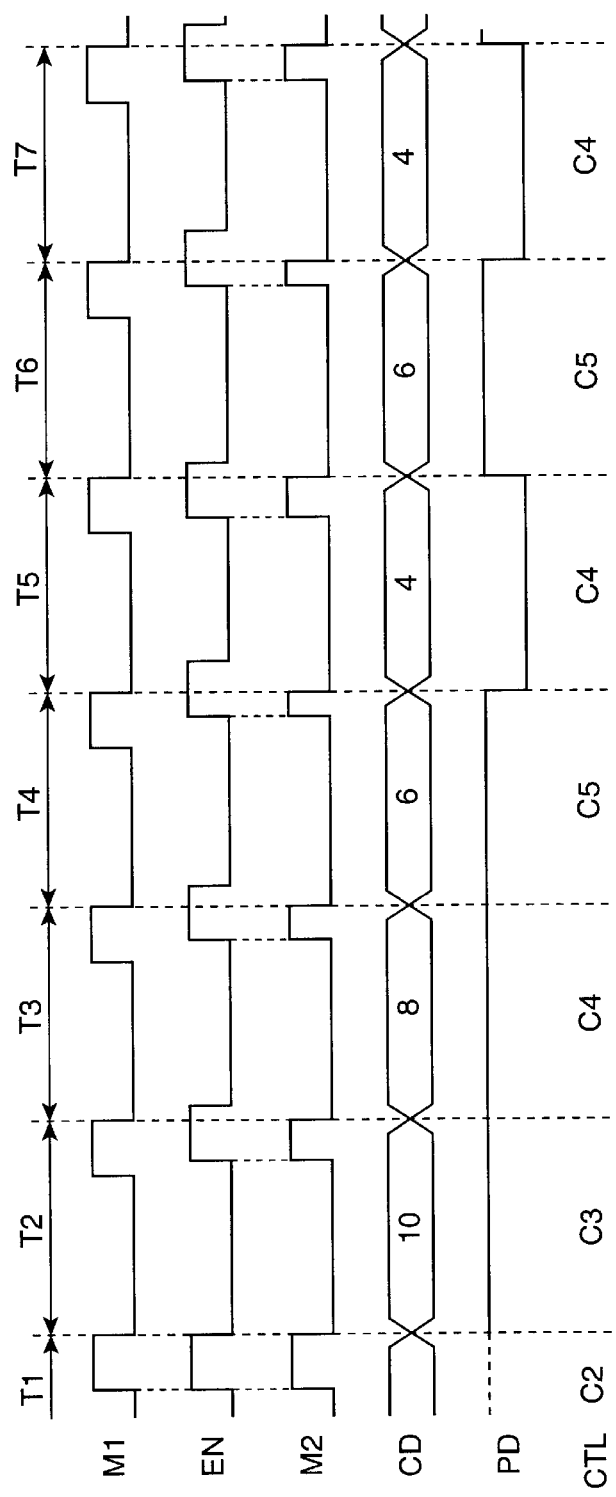
FIG. 12 is a timing diagram illustrating a phase adjustment operation of an enable pulse of the timing control circuit.
Figure 13:
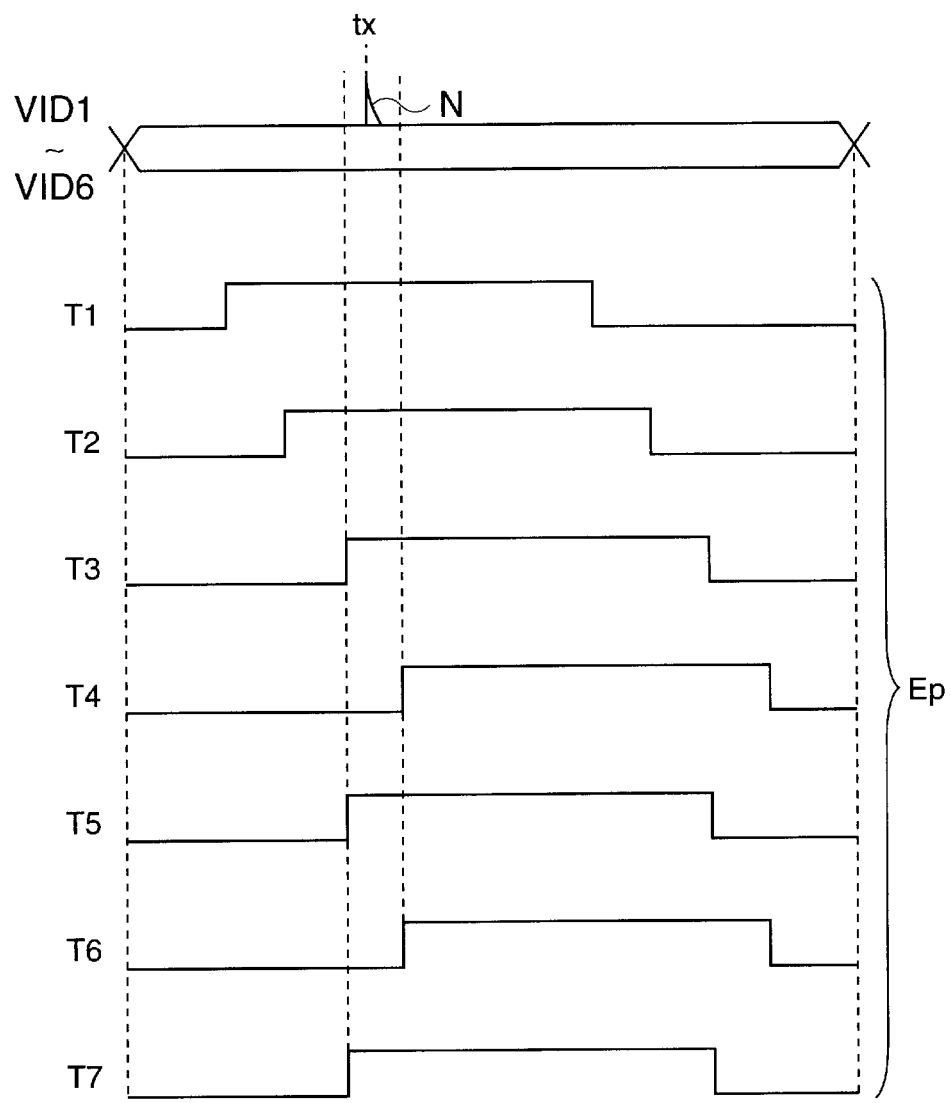
FIG. 13 illustrates the relationship between vide signals VID1–VID6 and phase-adjusted enable pulses.

The operation of the timing control circuit 200 is specifically discussed below. FIG. 12 is a timing diagram illustrating the operation of the timing control circuit 200. FIG. 13 illustrates the relationship between the video signals VID1-VID6 and the unable pulse Ep shown in FIG. 12. In this example, the value set to the reference data RD is "5", and the value of the count data CD becomes "10" when the phases of the monitor signal M1 and the reference pulse Er match each other, and in the default state, the selection signal CTL designates the selection of the signal C2. In addition, the delay time TD is time with the value of the count data CD corresponding to "2" (in other words, two periods of the monitor clock signal CLKm).

Referring to FIG. 12, during the period T1, the monitor signal M1 almost matches the reference pulse Er in phase, and during the subsequent period T2, the value of the count data CD becomes "10". With the condition CD≧RD holding, the comparison signal PD is transitioned to a high level, and the selection signal CTL designates the selection of the signal C3 which is delayed by one notch in phase from the signal C2 which is selected at the default setting. As a result, the reference pulse Er during the period T2 lags the monitor signal M1.

Since the signal C3 is delayed from the signal C2 by the time TD, the value of the count data CD during the period T3 becomes "8", which is smaller than the value of the count data CD during the period T2 by "2". As a result, the reference pulse Er during the period T3 is further delayed from the monitor signal M1.

The value of the CD changes from "10" to "8" to "6", and the signal C5 is selected. When the value of the count data CD becomes "4" during the period T5, the condition CD<RD holds. The comparison signal PD falls to a low level, and the selection signal CTL designates the selection of the signal C4, which leads the signal C5 by one notch in phase. As a result, the reference pulse Er in phase during the period T5 leads the reference pulse Er during the period T4. Thereafter, the value of the count data CD changes from "4" to "5", from "5" to "4", from "4" to "5", thereby alternating between "5" set as the value of the reference data RD, and "4" which is smaller by "1". For the period T4 thereafter, the selector circuit 203 alternately selects between the signal C4 and the signal C5.

Referring to FIG. 13, the relationship between the video signals VID1–VID6 and the enable pulse Ep is discussed below. It is assumed that noise is superimposed on the video signals VID1–VID6 at time tx. As shown in FIG. 12, the selector circuit 203 selects signals C2, C3, C4, C5, C4, C5, C4 in that order from the period T1 through the period T7. The phase of the enable pulse Ep with respect to the video signals VID1–VID6 successively changes as shown in FIG. 13. In other words, the timing control circuit 200 changes the phase of the enable pulse Ep with respect to the video signals VID1–VID6 within a range referenced to a target value in response to the phase difference signal M2. The target value here corresponds to a value set as the reference data RD.

The noise N superimposed on the video signals VID1–VID6 is generated at a level transition of each timing signal generated in the timing control circuit 200. In this embodiment, the pulse width of each of the sampling signals S1, S2, S3, . . . , Sm is limited to the pulse width of the enable pulse Ep. The phase of the enable pulse Ep is continuously adjusted with respect to the video signals VID1–VID6. For this reason, the noise N is sometimes sampled, other times not sampled. In the example illustrated in FIG. 13, the noise N is sampled during the periods T1, T2, T3, T5, and T7, but is not sampled during the periods T4 and T6. The noise N becomes pronounced when it is consecutively sampled, but if the noise N is sometimes sampled and other times not sampled, it is distributed and less pronounced.

If the generation timing of the noise N is known, the phase of the enable pulse Ep is fixed not to sample the noise N. However, the noise N is generated in synchronization with the X clock signal CLX, but predicting the generation timing of the noise N with respect to the video signals VID1–VID6 in the design phase of the device is difficult because the generation timing of the noise N depends on a variety of factors such as the routing of the wiring, and the layout of the circuit board and the liquid-crystal panel.

In this embodiment, the phase of the enable pulse Ep is not fixed with respect to the video signals VID1–VID6 and is varied within a predetermined range with respect to the target value as a reference. The noise N, the generation timing thereof is not known, may or may not be sampled. Even if the TFT characteristics vary depending on temperature and aging, the video signals VID1–VID6 are precisely sampled and the degradation of the image quality due to the noise N is controlled.

<Modifications and Changes>

The liquid-crystal display device is not limited to the one described above. The following modifications and changes are possible.

<Time Duration for Phase Adjustment>

In the above-referenced liquid-crystal display device, the count data CD is compared with the reference data RD every horizontal scanning period. The selector circuit 203 selects a signal in response to the comparison signal PD representing the comparison result, thereby adjusting the phase of the enable pulse Ep. The present invention is not limited to this arrangement. The duration of time throughout which the phase is adjusted may be limited to a particular duration.

For example, for a constant duration from when the power is switched on, the temperature of the liquid-crystal panel 100 gradually rises. As a result, the response speed of the TFT changes. For the duration, the phase of the enable pulse Ep must be adjusted. As the temperature of the liquid-crystal panel 100 is saturated, the response speed of the TFT is stabilized. There is no much need for adjusting the phase of the enable pulse Ep thereafter.

Figure 14:
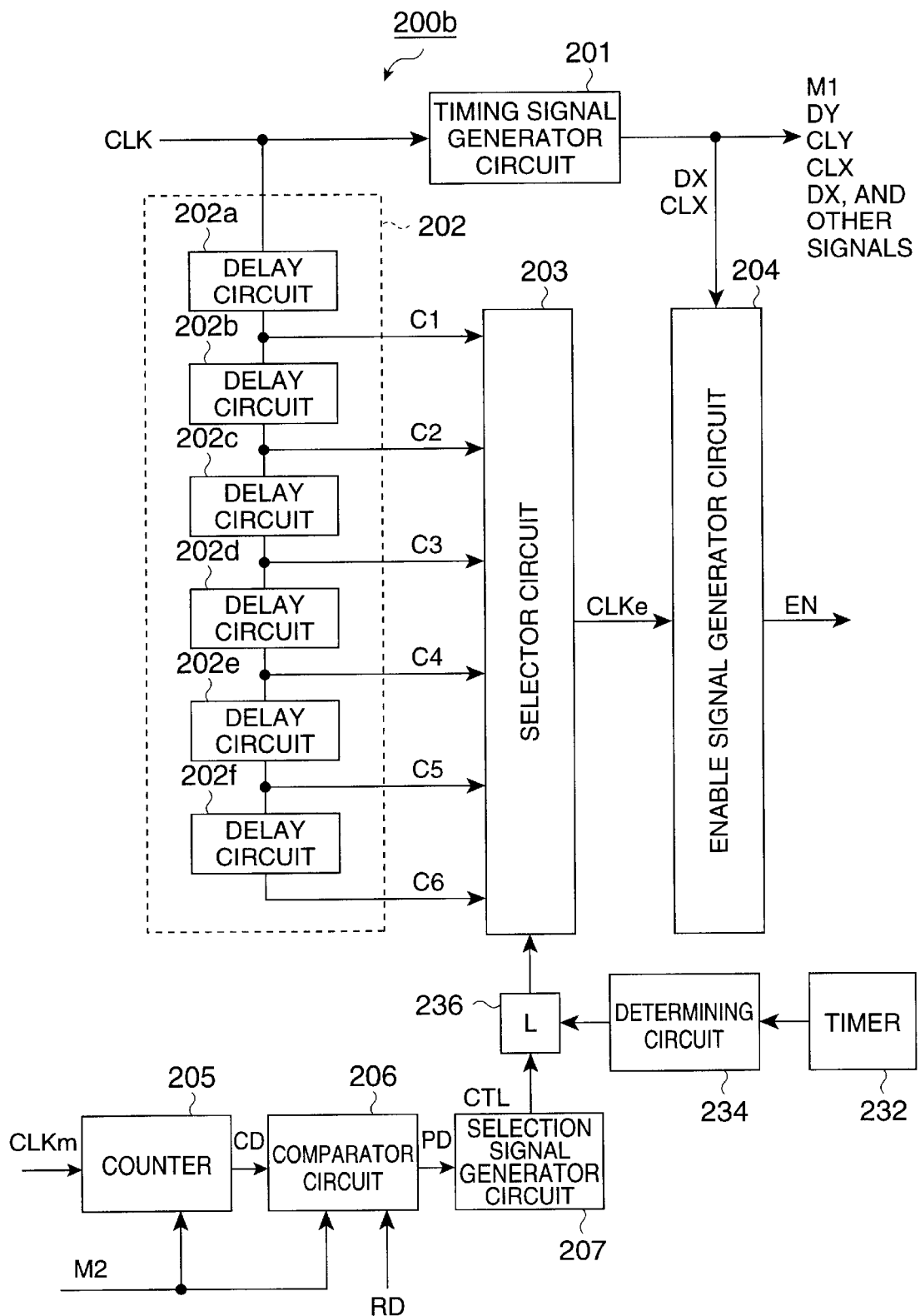
FIG. 14 is a block diagram illustrating the construction of the timing control circuit in accordance with a first modification.

The phase of the enable pulse Ep may be adjusted within a constant time from the power on. To this end, a timing control circuit 200b shown FIG. 14 may be used. The difference between the timing control circuit 200b and the timing control circuit 200 is in that the timing contend circuit 200b further includes a timer 232, a determining circuit 234, and a latch circuit (L) 236.

The timer 232 measures time from the power on, the determining circuit 234 determines whether the time measurement result means the elapse of constant time, and the latch circuit 236 latches the selection signal CTL when the determination result of the determining circuit 234 is affirmative.

In this arrangement, the selection signal CTL from the selection signal generator circuit 207 is directly fed to the selector circuit 203 until the constant time has elapsed since the power on. The phase of the reference pulse Er is adjusted. When the constant time has elapsed since the power on, the selection signal CTL is latched regardless of the operation of the selection signal generator circuit 207. The selector circuit 203 is fixed to the state immediately prior to the latching. In this arrangement, the phase of the reference pulse Er is not adjusted once the constant time elapses.

Figure 15:
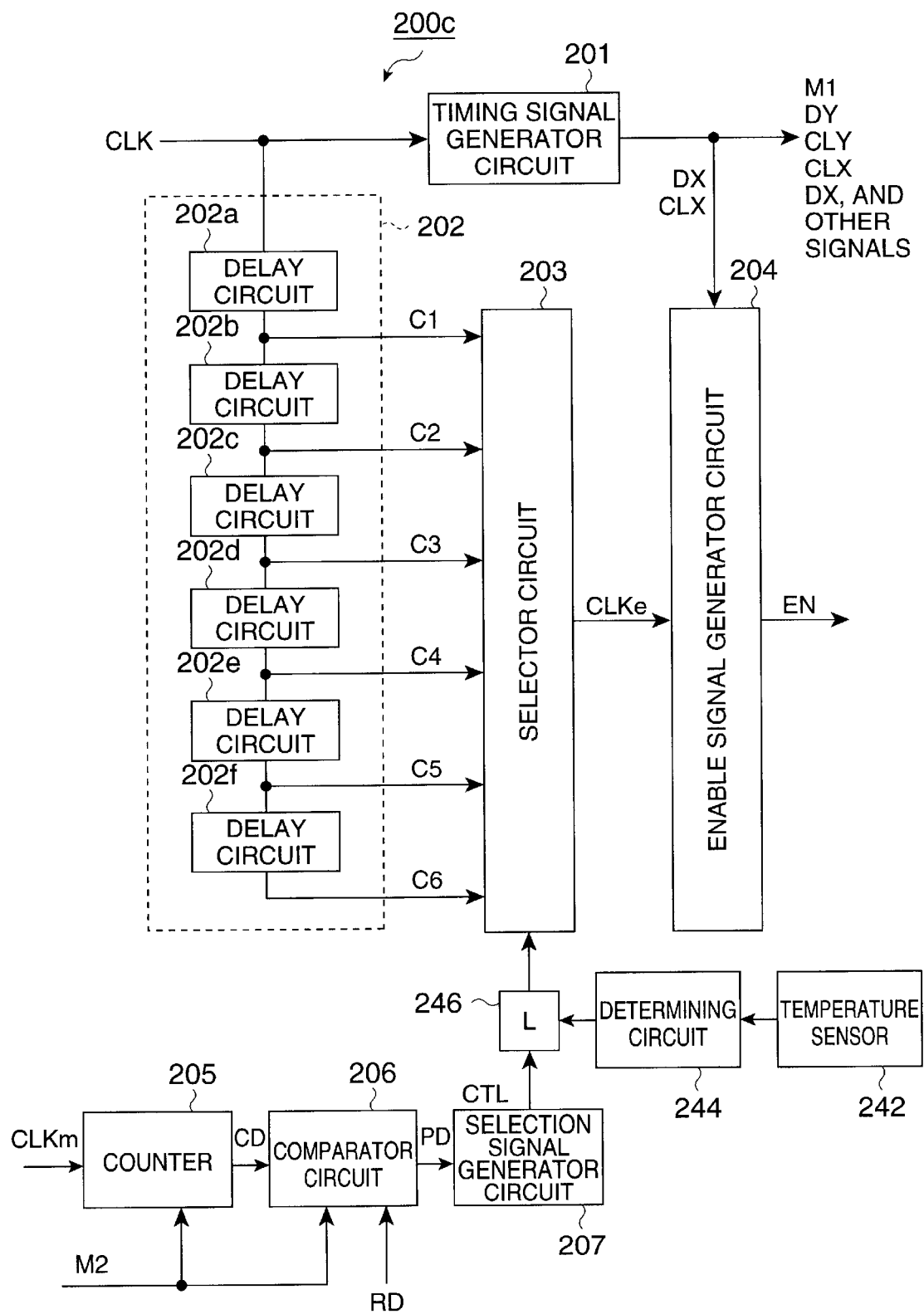
FIG. 15 is a block diagram illustrating the construction of the timing control circuit in accordance with a second modification.

The temperature of the liquid-crystal panel 100 may be directly measured. More specifically, as shown in FIG. 15, a timing control circuit 200c Including a temperature sensor 242, a determining circuit 244, and a latch circuit (L) 246 may be used. The temperature sensor 242 detects the temperature of the liquid-crystal panel 100. Another TFT may be formed in the liquid-crystal panel 100 as the temperature sensor 242, and the temperature of the liquid-crystal panel 100 may be detected by sensing a change in the resistance of the TFT. The determining circuit 244 determines the temperature saturation by detecting that a rate of change of temperature detected by the temperature sensor 242 falls within a predetermined value. The latch circuit 246 latches the selection signal CTL when the determination results of the determining circuit 244 are affirmative.

When the temperature is determined to be saturated with the rate of change of temperature of the liquid-crystal panel

100 falling within a predetermined value in this arrangement, the selector circuit 203 is fixed to the immediately prior state. The phase of the reference pulse Er is not adjusted thereafter.

<Time Interval of Phase Adjustment>

The time interval of the phase adjustment may be every predetermined interval rather than every horizontal scanning period. Specifically, the following example is considered.

First, the monitor signal M1 may be generated every predetermined number of horizontal scanning periods (every 4H, for example). Specifically, a 2 bit ring counter may be arranged in the timing signal generator circuit 201. The ring counter counts the start pulse DX. Only when the count is "zero", the timing signal generator circuit 201 generates the monitor signal M1.

Second, the reference pulse Er may be generated every predetermined number of horizontal scanning periods (every 4H, for example). Specifically, a 2 bit ring counter may be arranged in the timing signal generator circuit 201. The ring counter counts the start pulse DX. Only when the count is "zero", the start pulse DX is fed to the enable signal generator circuit 204.

When the start pulse DX is not supplied in this arrangement, the flipflop 2044 is consecutively reset by the clock signal CLX. The signal Q is kept to a low level, and the reference pulse Er is not generated within the blanking time.

<Phase Adjustment with Disturbance Added>

Figure 16:
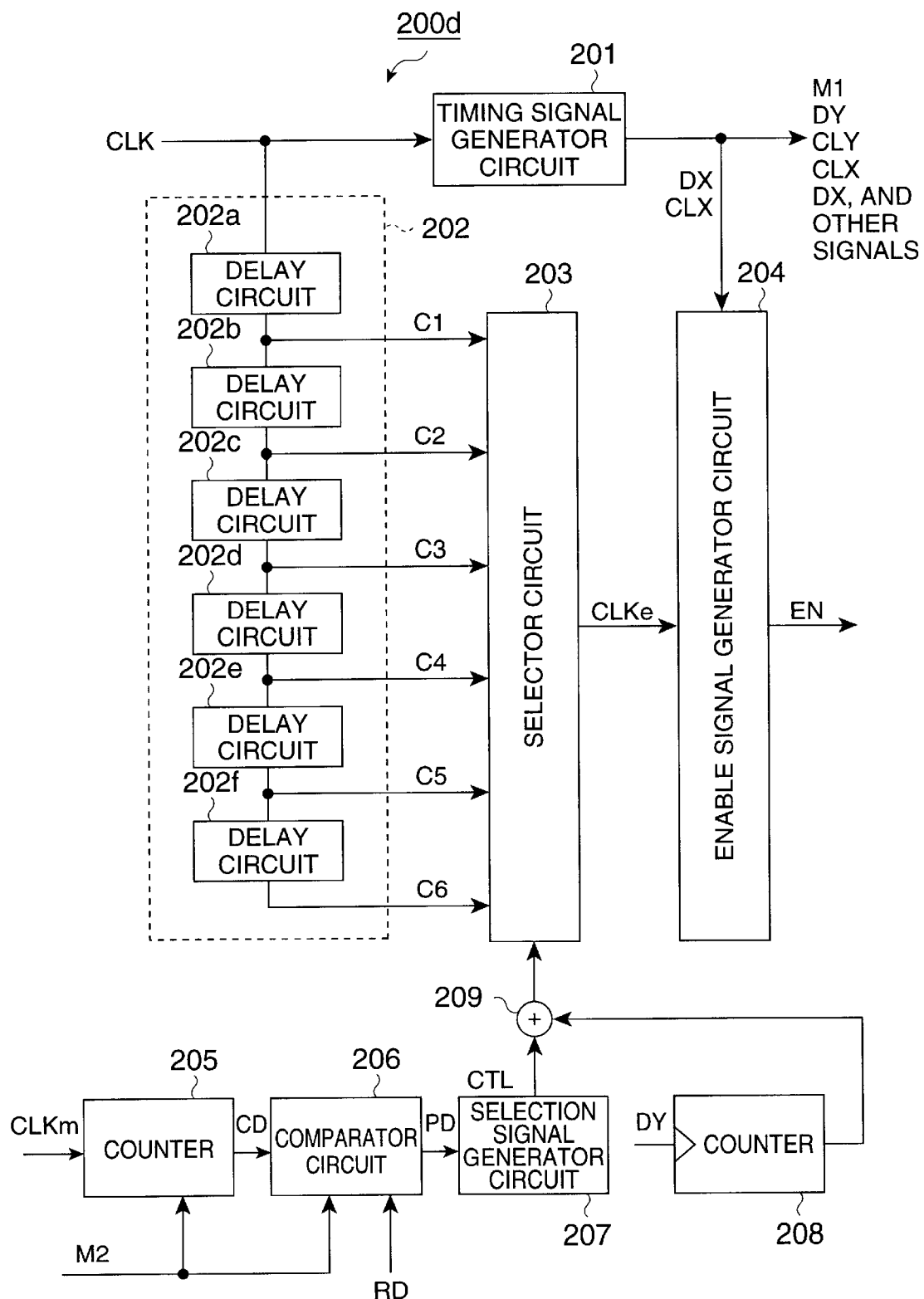
FIG. 16 is a block diagram illustrating the construction of the timing control circuit in accordance with a third modification.

In the above-referenced liquid-crystal display device, the phase of the enable pulse Ep is adjusted based on the phase difference signal M2 representing the phase difference between the reference pulse Er and the monitor signal M1. The enable pulse Ep may be forced to change by varying the phase of the enable clock signal CLKe. To this end, at timing control circuit 200*d* illustrated in FIG. 16 may be used. The difference between the timing control circuit 200*d* and the timing control circuit 200 shown in FIG. 8 is in that the timing control circuit 200*d* includes a counter 208 and an adder circuit 209

The counter 208 is a 2 bit ring counter, and counts the start pulse DX. The adder circuit 209 sums the count and the value of tile selection signal CTL (originally, a 3 bit value representing one of the signals C1–C6). The selector circuit 203 in this arrangement selects one of the signals C1–C6 in response to the addition results provided by the adder circuit 209.

In this example, the count of the counter 208 works as disturbance which varies the phase of the enable clock signal CLKc, namely, the phase of the enable pulse Ep with respect to the video signals VID1–VID6. In this way, the phase of the enable pulse Ep is adjusted within a predetermined range with respect to the noise N. The noise N becomes distributed and less pronounced on screen.

Besides the counter 208, a generator circuit generating a positive number and a negative number at random may be used to generate disturbance.

<Number of Delay Circuit Stages>

In the above-referenced liquid-crystal display, the enable clock signal CLKe is selected from one of the signals C1–C6. As the number of stages or delay is increased, the delay time per stage may be shortened to adjust the phase in finer steps. For example, the group of delay circuits 202 may include 64 delay circuits connected in cascade, and may selects one of 64 signals C1–C64 in response to the selection signal CTL. It will be clear according to the description above that the signals C1–C64, although not shown, are those that are produced by delaying the reference clock signal CLK in 64 steps down to a signal that is delayed by half the period of the reference clock signal CLK.

<Selection Having Hysteresis Property>

In the above-referenced liquid-crystal display device, the enable clock signal CLKe is the one selected from the signals C1–C6 in response to the selection signal CTL. The selection characteristics may have a hysteresis property. To impart the hysteresis property to the selection operation, the selection signal generator circuit 207 in FIG. 8 may be replaced with a selection signal generator circuit 207*e* illustrated in FIG. 17.

As shown, the selection signal generator circuit 207 includes a first memory 2071, a non-coincidence detector circuit 2072, a second memory 2073, and an adder and subtracter circuit 2074. In this example, the group of delay circuits 202 is composed of 64 delay circuits connected in cascade, and the selector circuit 203 selects one from the 64 signals C1–C64 in response to a 6 bit selection signal CTL.

The first memory 2071 stores the phase comparison signal PD, and outputs the preceding phase comparison signal PD (one horizontal scanning period before) as the immediately prior phase comparison signal PD'. The non-coincidence detector circuit (detector circuit) 2072 compares the logical levels of the phase comparison signal PD and the immediately prior phase comparison signal PD', and outputs a non-coincidence signal SR at an active level (a high level) when the two signals do not coincide with. In this way, the non-coincidence detector circuit 2072 detects a change in the logical level of the phase comparison signal PD from one horizontal scanning period before. The logical level of the phase comparison signal PD is transitioned when the state of CD≧RD is shifted to the state of CD<RD, or when the state of CD<RD is shifted to the state of CD≧RD. The target value of the feedback control is the reference data RD. The fact that the non-coincidence signal SR is at an active level means that the count data CD, which is a measured value, is close to the target value.

The second memory 2073 stores the selection signal CTL, and supplies the adder and subtracter circuit 2074 with the preceding selection signal CTL (one horizontal scanning period before). The second memory 2073 stores the selection signal CTL designating the selection of a signal C32 (an substantially intermediate point of the number of delay stages) as a default value. When the power of the liquid-crystal display device is switched on, the selection signal CTL is read.

Figures 17, 18:
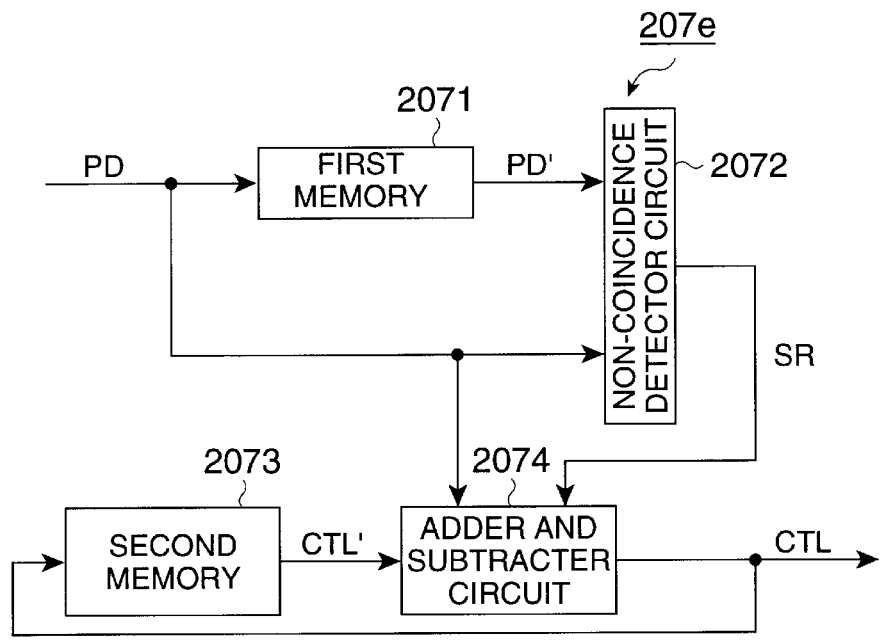
FIG. 17 is a block diagram illustrating the construction of a selection signal generator circuit in the timing control circuit in accordance with a fourth modification.
FIG. 18 is a truth table illustrating an addition/subtraction process in the selection signal generator circuit.

In response to the phase comparison signal PD and the non-coincidence signal SR, the adder and substracter circuit 2074 performs addition and subtraction to the value predetermined in the selection signal CTL' read from the second memory 2073, thereby generating the selection signal CTL. FIG. 18 is a truth table of the addition/subtraction of the adder and subtracter circuit 2074. When PD=high level and SR=low level, "1" is added to the value of the selection signal CTL', thereby generating the selection signal CTL. When PD=low level and SR=low level, "1" subtracted from the value of the selection signal CTL', thereby generating the selection signal CTL. This is true of the selection signal generator circuit illustrated in FIG. 8.

When PD=high level and SR=high level, "10" is added to the selection signal CTL', thereby generating the selection signal CTL. When the PD=low level and SR=high level, "10" is subtracted from the selection signal CTL', thereby generating the selection signal CTL. In other words, when the logical level of the comparison signal PD changes, and when the measured value close to the target value is detected, the measured value is intentionally operated to distance itself from the target value. In this way, the phase of the enable signal EN is varied within a range centered on the target value. As a result, the noise N is dispersed across the screen to be less visible. Depending on temperature and aging, the phases of the video signals VID1–VID6 and the sampling signals S1, S2, S3, . . . , Sm are adjusted.

<Phase Adjustment of Start Pulse DX and X Clock Signal CLX>

Figure 19:
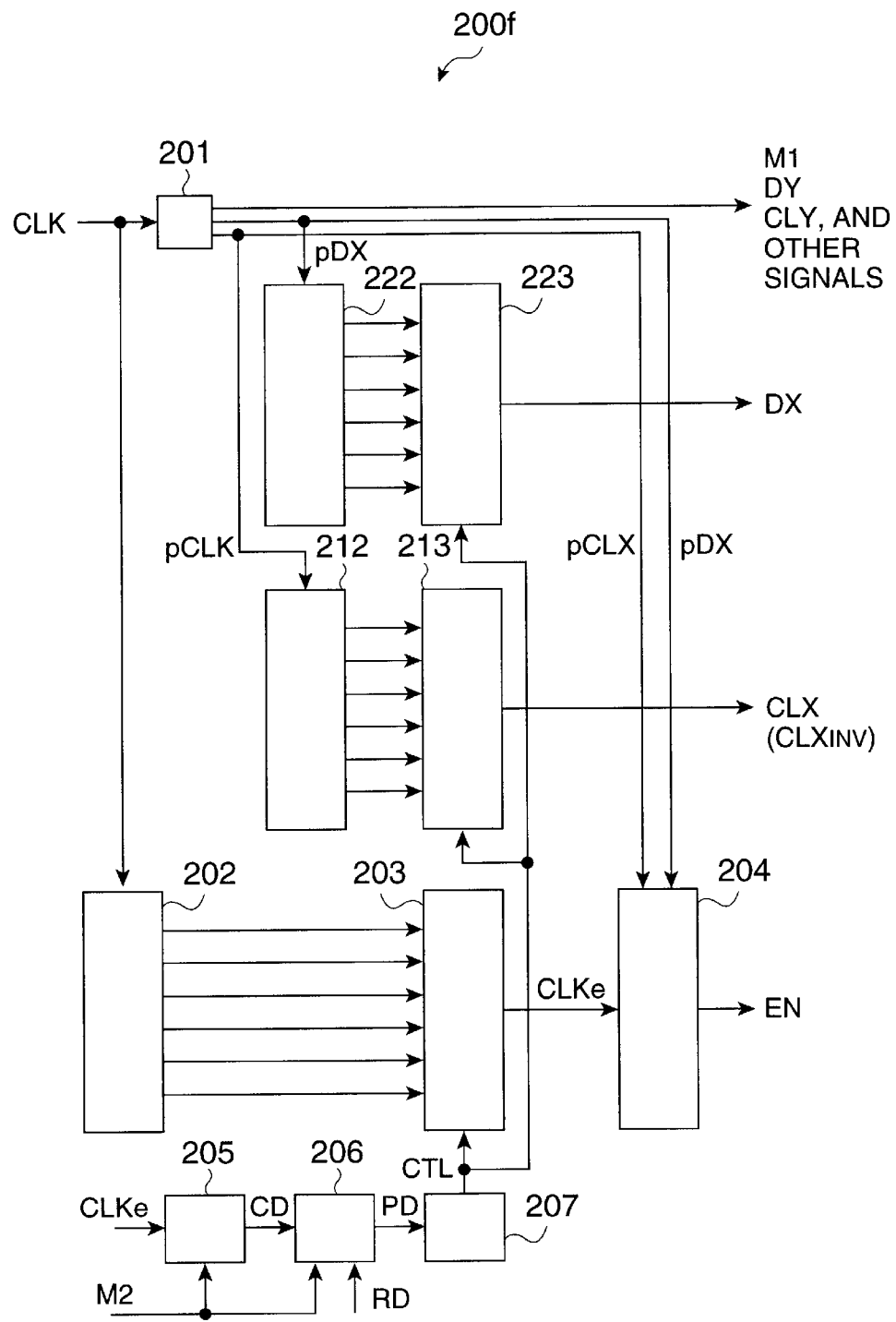
FIG. 19 is a block diagram illustrating the construction of the timing control circuit in accordance with a fifth modification.

In the above-referenced liquid-crystal display device, the phase of the enable pulse Ep only is adjusted with respect to the video signals VID1–VID6 The start pulse DX and the X clock signal CLX (and the inverted X clock signal CLX INV) may be adjusted by the same amount of phase as that adjusted in the enable pulse Ep. FIG. 19 is a block diagram illustrating the major portions of a timing control circuit 200f which also phase adjusts the start pulse DX and the X clock signal CLX. This arrangement includes no component for controlling the video signal processor circuit 300.

As shown, the start pulse pDX is a signal just generated by the timing signal generator circuit 201, and prior to the phase adjustment. The start pulse pDX corresponds to the start pulse DX illustrated in FIG. 8. Likewise, the X clock signal CLX is a signal just generated by the timing signal generator circuit 201, and prior to the phase adjustment. The X clock signal CLX corresponds to the X clock signal CLX illustrated in FIG. 8.

Referring to FIG. 19, the start pulse pDX generated in the timing signal generator circuit 201 is fed to a group of delay circuits 222. The group of delay circuits 222 includes the same number of cascaded delay circuits, as that in the group of delay circuits 202, and each having the same delay time as that of the group of delay circuits 202. The signals output from the delay circuits are fed to a selector circuit 223. The selector circuit 223 selects one of the signals output from the delay circuits of the group of delay circuits 222 in response to the selection signal CTL from the selection signal generator circuit 207, and then feeds the selection signal to the liquid-crystal panel 100 as the start pulse DX.

The X clock signal pCLX generated by the timing signal generator circuit 201 is fed to a group of delay circuits 212. The group of delay circuits 212 includes the same number of cascaded delay circuits, as that in the group of delay circuits 202, and each having the same delay time as that of the group of delay circuits 202. The signals output from the delay circuits are fed to a selector circuit 213. The selector circuit 213 selects one of the signals output from the delay circuits of the group of delay circuits 212 in response to the selection signal CTL from the selection signal generator circuit 207, and then feeds the selection signal to the liquid-crystal panel 100 as the X clock signal CLX. A component for phase adjusting the inverted X clock signal CLX INV is not discussed here, but has the same construction as that for phase adjusting the X clock signal CLX.

The start pulse pDX and the X clock signal pCLX are synchronized with the reference clock signal CLK through the timing signal generator circuit 201. The reference clock signal CLK is produced in synchronization with the video signal VID input from outside as already discussed. The video signals VID1–VID6 are also serial-to-parallel converted in synchronization with the video signal VID as already discussed. For this reason, in the arrangement illustrated in FIG. 19, the start pulse DX and the X clock signal CLX (the inverted X clock signal CLX INV) are phase adjusted by the same amount as that adjusted in the reference pulse Er with respect to the video signals VID1–VID6, and are then fed to the liquid-crystal panel 100.

The X clock signal CLX (the inverted X clock signal CLX INV) is transferred through a signal line 1322 (1324) like the signal line 1326 for feeding the enable signal in the data line driving circuit 130, and is thus subject to delaying. The start pulse DX has a similar transfer path in the shift register 1350, and is subject to delaying.

In the arrangement illustrated in FIG. 19, the start pulse DX and the X clock signal CLX (the inverted X clock signal CLX INV) are phase adjusted by the same amount as that adjusted in the reference pulse Er, and are practically then fed to the liquid-crystal panel 100. Together with the phase adjustment, of the reference pulse Er, the sampling signals S1, S2, S3, . . . , Sm which precisely sample the video signals VID1–VID6 are generated.

<Use of the Start Pulse DX for the Monitor Signal>

Figure 20:
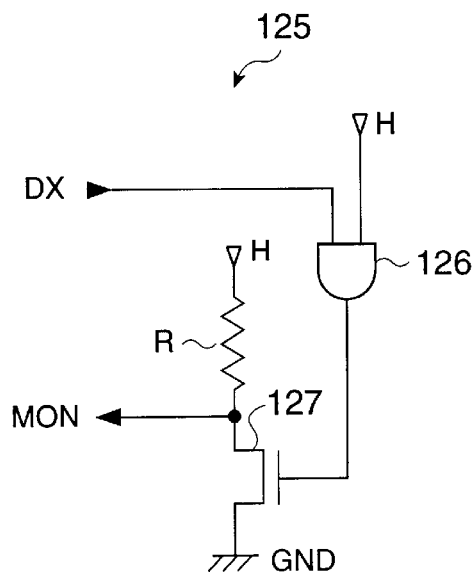
FIG. 20 is a block diagram illustrating the construction of the dummy circuit in accordance with the fifth modification.

When the start pulse DX is phase adjusted, the start pulse DX itself rather than the monitor signal M1 may be used as a reference signal for detecting the phase difference to the video signals VID1–VID6. More specifically, in this arrangement the start pulse DX supplied to the liquid-crystal panel 100 is shifted in the data line driving circuit 130, and is fed to a dummy circuit 125 through the signal line 167 instead of the monitor signal M1 as shown in FIG. 20. The dummy circuit 125 includes an AND gate 126 and a TFT 127, respectively identical to the elements of the AND gate 1379 in the data line driving circuit 130 and the sampling switch 141 in the sampling circuit 140.

The AND gate 126 feeds an AND signal of the start pulse DX fed to one input terminal thereof and a high level signal fed to the other input terminal to the gate of a TFT 127. The TFT 127 is configured with the drain grounded and with the source thereof pulled up to a high level at a feeder line through a resistor R. A signal MON appearing at the source of the TFT 127 is fed lo the timing control circuit 200.

Figure 21:
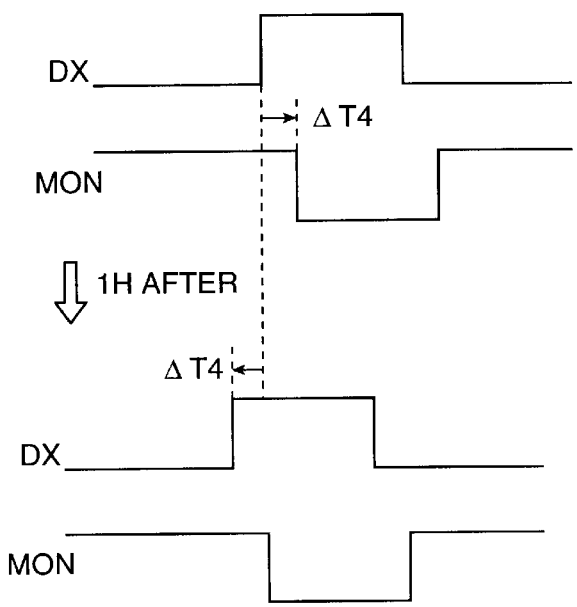
FIG. 21 is a timing diagram illustrating a phase adjustment operation of a start pulse DX in accordance with the fifth modification.

During the blanking time of any one horizontal scanning period, the start pulse DX is now output from the timing control circuit 200 as shown in FIG. 21. The start pulse DX is fed prior to the video signals VID1–VID6 which are sampled during the horizontal scanning period. The start pulse DX is supplied ahead of the video signals by a predetermined time. It may be considered that the, start pulse DX is supplied in synchronization with the video signals VID1–VID6.

The signal MON fed back through the signal line 167 and the dummy circuit 125 is delayed from the start pulse DX just output from the timing control circuit 200. Let ΔT4 represent the delay time, and during the blanking time in the next horizontal scanning period, the timing control circuit 200 outputs the start pulse DX ahead of the output timing during the blanking time in the prior horizontal scanning period by the time ΔT4. Specifically, to adjust the output timing of the start pulse DX, one of the start pulse pDX delayed by the group of delay circuits is selected and output as the start pulse DX, and then the start pulse pDX which is by the delay time ahead is then reselected, and is output as the start pulse DX. The enable pulse Ep and the X clock signal CLX (the inverted X clock signal CLX INV) are reselected to result in a lead by the time ΔT4.

The phases of the start pulse DX, the X clock signal CLX, and the enable pulse Ep may be varied within a predetermined range centered on a target value as in the preceding embodiment. The monitor results of the start pulse DX output during the blanking time of a given horizontal scanning period may be reflected in the phase adjustment of the start pulse DX in the horizontal scanning period after the next horizontal scanning period rather than in the next horizontal scanning period.

<Examples of Electro-Optical Devices>

The above-referenced liquid-crystal display device is one example of the electro-optical device. Besides the liquid-crystal display device, the present invention may be applied to electro-optical devices which present a display, using, as an electro-optical material, electroluminescence (EL), plasma or phosphorescence for its electro-optical effect. When the EL is used as the electro-optical device, the pixel electrodes 118, a light emission layer (EL) layer, and the common electrode are laminated on the element substrate 101, and the counter substrate 102, which is required in the liquid-crystal device, is dispensed with.

The present invention is applied to an electro-optical device having a structure similar to that of the above-referenced liquid-crystal device.

<Electronic Equipment>

Several pieces of electronic equipment incorporating the above-referenced liquid-crystal display device will now be discussed.

<Projector>

Figure 22:
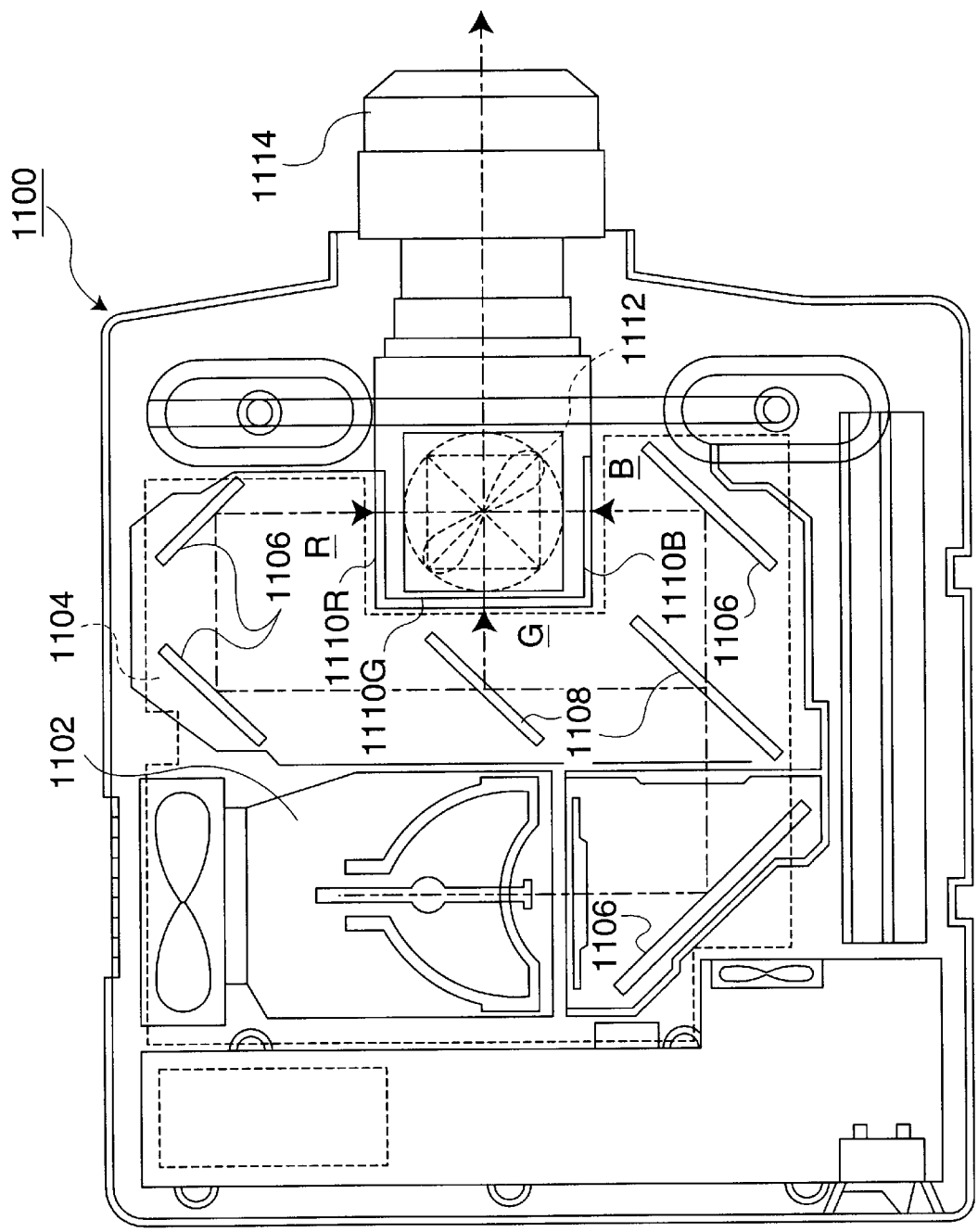
FIG. 22 is a cross-sectional view illustrating the construction of a projector as one example of electronic equipment incorporating the liquid-crystal display device.

A projector using the liquid-crystal panel of the liquid-crystal display device as a light valve is discussed below. FIG. 22 is a plan view of the construction of the projector.

As shown, a projector 1100 includes a lamp unit 1102 formed of a white light source such as a halogen lamp. Light emitted from the lamp unit 1102 is separated into three RGB color beams through four mirrors 1106 and two dichroic mirrors 1108 in a light guide 1104, and the three color light beams are then guided to liquid-crystal panels 1110R, 1110B, and 1110G as respective light valves for the primary colors.

The liquid-crystal panels 1110R, 1110B, and 1110G are identical in construction to that of the liquid-crystal panel 100, and are driven by three R, G, and B color signals from a video signal processor circuit (not shown). Light beams modulated by these liquid-crystal panels are incident on a dichroic prism 1112 from three directions. In the dichroic prism 1112, R and B light beams are bent at a right angle while G light beam travels straight. The three color light beams are synthesized into a color image, which is projected onto a screen through a projection lens 1114. Since the R, G, and B color light beams respectively incident on the liquid-crystal panels 1110R, 1110B, and 1110G through the dichroic mirrors 1108, no color filters are required.

<Mobile Computer>

Figure 23:
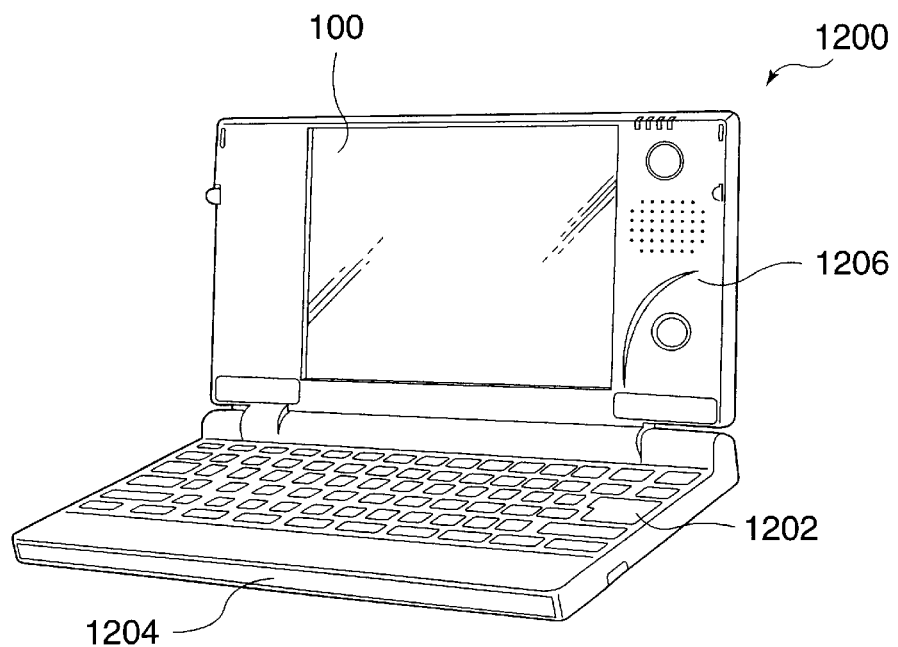
FIG. 23 is a perspective view illustrating the construction of a personal computer as one example of the electronic equipment incorporating the liquid-crystal display device.

One example is discussed in which the liquid-crystal device is incorporated in a mobile computer. FIG. 23 is a perspective view illustrating the construction of the personal computer. As shown, the mobile computer 1200 includes a main unit 1204 with a keyboard 1202, and a liquid-crystal display unit 1206. The liquid-crystal display unit 1206 includes the above-referenced liquid-crystal panel 100 with a backlight attached therebehind.

<Mobile Telephone>

Figure 24:
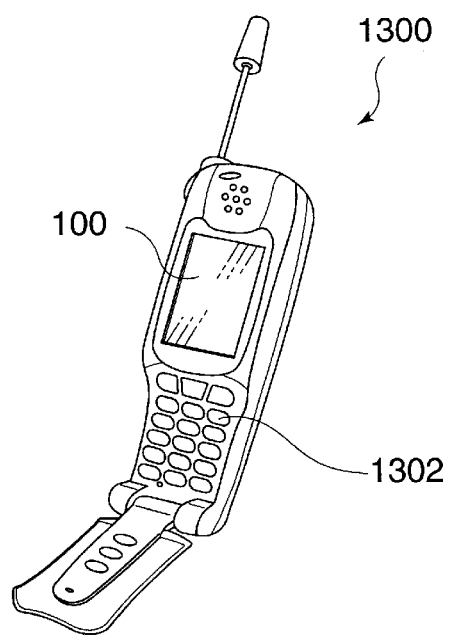
FIG. 24 is a perspective view illustrating the construction of a mobile telephone as one example of the electronic equipment incorporating the liquid-crystal display device.

Another example is discussed in which the liquid-crystal display device is applied to a mobile telephone. FIG. 24 is a perspective view illustrating the construction of the mobile telephone. As shown, the mobile telephone 1302 includes a plurality of control buttons 1302, and a reflective-type liquid-crystal panel 100. A front light is arranged on the reflective-type liquid-crystal panel 100 as necessary.

Besides the electronic equipment discussed with reference to FIG. 22, FIG. 23, and FIG. 24, the electronic equipment of the present invention may be any of a diversity of electronic equipment including a liquid-crystal display television, a viewfinder type or direct monitoring type video cassette recorder, a car navigation system, a pager, an electronic pocketbook, an electronic tabletop calculator, a word processor, ad workstation, a video phone a POS terminal, an apparatus having a touch panel, etc. The liquid-crystal display device is applied to any of these pieces of electronic equipment.

In accordance with the present invention, the sampling signal is generated and image quality is prevented from being degraded even if the phase of the enable pulse shifts with respect to the video signal and even if noise is superimposed on the video signal.

What is claimed is:

1. A driving circuit for driving an electro-optical panel having a transistor and a pixel electrode at each intersection of each of a plurality of scanning lines and each of a plurality of data lines, comprising:

a scanning line driving circuit which selects a scanning line of the plurality of scanning lines to supply a transistor corresponding to the selected scanning line with a signal to turn on the transistor;

a data line driving circuit which generates a shift pulse to elect a data line of the plurality of data lines within a duration during which the scanning line is selected, and limits the pulse width of the shift pulse to the pulse width of an enable pulse narrower than the shift pulse width and outputs the shift pulse with the narrow pulse width as a sampling signal;

a sampling circuit which samples a video signal within the pulse duration of the sampling signal and feeds the sampled signal to at least one data line;

a dummy circuit which is arranged adjacent to the sampling circuit and the data line driving circuit, and outputs a phase difference signal representing a phase difference between a monitor signal supplied in synchronization with the video signal and a reference pulse supplied in synchronization with the enable pulse; and an enable pulse adjustment circuit which adjusts the phase of the enable pulse so that the phase of the enable pulse leads with respect to the video signal when the phase difference signal indicates that the reference pulse lags the monitor signal in phase, or so that the phase of the enable pulse lags with respect to the video signal when the phase difference signal indicates that the reference pulse leads the monitor signal in phase.

2. The driving circuit for driving an electro-optical panel according to claim 1, the dummy circuit including an element identical to that which is also used in the sampling circuit and the data line driving circuit as portions thereof.

3. The driving circuit for driving an electro-optical panel according to claim 1, the enable pulse adjustment circuit repeatedly alternating between delaying and advancing the enable pulse in phase within a predetermined range with respect to a target value.

4. The driving circuit for driving an electro-optical panel according to claim 1, the scanning line driving circuit, the data line driving circuit, the sampling circuit, and the dummy circuit being arranged on the same substrate.

5. The driving circuit for driving an electro-optical panel according to claim 1, further including a determining circuit which determines whether a constant duration of time elapses from the switching of power source, or determines whether a change in temperature of the electro-optical panel falls within a predetermined value, the enable pulse adjustment circuit adjusting the phase of the enable pulse until the determination results provided by the determining circuit become affirmative, and when the determination results provided by the determining circuit become affirmative, the enable pulse adjustment circuit fixing the phase of the enable pulse to a phase immediately prior to the occurrence of the affirmative results.

6. The driving circuit for driving an electro-optical panel according to claim 1, the enable pulse adjustment circuit including:
- a group of delay circuits which output a plurality of signals different from each other in the amount of delay by delaying a reference clock signal synchronized with the video signal,
- a selection signal generator circuit which generates a selection signal to select one from among the plurality of signals output from the group of delay circuits, in accordance with the phase difference represented by the phase difference signal,
- a selector circuit which selects the one of the signals represented by the selection signals, from among the plurality of signals output from the group of delay circuits, as an enable clock signal, and
- an enable signal generator circuit which generates the enable pulse from a portion of the enable clock signal.

7. The driving circuit for driving an electro-optical panel according to claim 6, the selection signal generator circuit generating the selection signal based on the results of comparison of the phase difference represented by the phase difference signal, which is the phase lag of the reference pulse with respect to the monitor signal, with a predetermined target time.

8. The driving circuit for driving an electro-optical panel according to claim 6, the selection signal generator circuit generating the selection signal every horizontal scanning period or every plurality of horizontal scanning periods.

9. The driving circuit for driving an electro-optical panel according to claim 6, the phase difference signal being a pulse signal, the pulse width of which becoming shorter as the delay of the reference pulse becomes longer with respect to the monitor signal,
- the enable pulse adjustment circuit further including a comparator circuit which compares the pulse width of the phase difference signal with a predetermined target time to determine which is longer, and
- the selection signal generator circuit generating the selection signal based on the comparison results provided by the comparator circuit.

10. The driving circuit for driving an electro-optical panel according to claim 6, the phase difference signal being a pulse signal, the pulse width of which becoming shorter as the delay of the reference pulse becomes longer with respect to the monitor signal,
- the group of delay circuits including a plurality of delay circuits, each having a respective delay time, connected in cascade,
- the enable pulse adjustment circuit further including a comparator circuit which compares the pulse width of the phase difference signal with a predetermined target time to determine which is longer, and
- the selection signal generator circuit generating the selection signal to select a signal having a delay time one notch longer from among the plurality of signals output from the group of delay circuits when the comparison results provided by the comparator circuit are affirmative, or generating the selection signal to select a signal having a delay time one notch shorter from among the plurality of signals output from the group of delay circuits when the comparison results provided by the comparator circuit are non-affirmative.

11. The driving circuit for driving an electro-optical panel according to claim 6, the enable pulse adjustment circuit further including an adder which adds disturbance to the selection signal generated by the selection signal generator circuit, and
- the selector circuit selecting a signal indicated by the selection signal to which disturbance is added by the adder, from among the plurality of signals output from the group of delay circuits.

12. The driving circuit for driving an electro-optical panel according to claim 6, the selection signal generator circuit generating the selection signal to select a signal having a longer phase delay from among the plurality of signals output from the group of delay circuits when the phase difference represented by the phase difference signal, which is the phase delay of the reference pulse with respect to the monitor sign falls within a constant value.

13. The driving circuit for driving an electro-optical panel according to claim 6, the phase difference signal being a pulse signal, the pulse width of which becoming shorter as the delay of the reference pulse becomes longer with respect to the monitor signal,
- the group of delay circuits including a plurality of delay circuits, each having a respective delay time, connected in cascade,
- the enable pulse adjustment circuit further including a comparator circuit which compares the pulse width of the phase difference signal with a predetermined target time to determine which is longer,
- the selection signal generator circuit including a detector circuit which detects whether or not previous comparison results provided by the comparator circuit coincide with current comparison results provided by the comparator circuit, and
- in case of coincident detection results between the previous and current comparison results, the selection signal generator circuit generating a selection signal to select a signal having a delay amount one notch longer from among the plurality of signals output from the group of delay circuits when the current comparison results are affirmative, or generating a selection signal to select a signal having a delay amount one notch shorter from among the plurality of signals output from the group of delay circuits when the current comparison results are not affirmative, or
- in case of non-coincident detection results between the previous and current comparison results, the selection signal generator circuit generating a selection signal to select a signal having a delay amount several notches longer from among the plurality of signals output from the group of delay circuits when the current comparison results are affirmative, or generating a selection signal to select a signal having a delay amount several notches shorter from among the plurality of signals output from the group of delay circuits when the current comparison results are not affirmative.

14. The driving circuit for driving an electro-optical panel according to claim 1, the data line driving circuit generating a shift pulse by shifting a start pulse fed during a blanking time in a horizontal scanning period in response to a clock signal controlling a shifting operation,
- the data line driving circuit including a start pulse adjustment circuit which adjusts the phase of the start pulse in the same direction in and by substantially the same amount by which the phase of the enable pulse is adjusted by the enable pulse adjustment circuit, and
- further including a clock signal adjustment circuit which adjusts the phase of the clock signal in the same direction in and by substantially the same amount by which the phase of the enable pulse is adjusted by the enable pulse adjustment circuit.

15. The driving circuit for driving an electro-optical panel according to claim 14, the start pulse being used as the reference pulse.

16. The driving circuit for driving an electro-optical panel according to claim 15, when the dummy circuit outputs the phase difference signal representing the phase difference between the start pulse supplied during a horizontal scanning period and the monitor signal, the start pulse adjustment circuit adjusting the phase of the start pulse, based on the phase difference signal, during a horizontal scanning period after the first horizontal scanning period.

17. An electro-optical device, comprising:
an electro-optical panel; and
a timing control circuit;
the electro-optical panel including:
a plurality of scanning lines,
a plurality of data lines,
a transistor at each intersection of each of the plurality of scanning lines and each of the plurality of data lines,
a pixel electrode arranged corresponding to the transistor,
a scanning line driving circuit which selects a scanning line to supply a transistor corresponding to the selected scanning line with a signal to turn on the transistor,
a data line driving circuit which generates a shift pulse to select a data line, and limits the pulse width of the shift pulse to the pulse width of an enable pulse narrower than the shift pulse width and outputs the shift pulse with the narrower pulse width as a sampling pulse,
a sampling circuit which samples a video signal within the pulse duration of the sampling signal within a duration during which the scanning line is selected and feeds the sampled signal to one data line,
a dummy circuit which is arranged adjacent to the sampling circuit and the data line driving circuit, and outputs a phase difference signal representing a phase difference between a monitor signal supplied in synchronization with the video signal and a reference pulse supplied in synchronization with the enable pulse,
the timing control circuit including:
an enable pulse adjustment circuit which adjusts the phase of the enable pulse so that the phase of the enable pulse leads with respect to the video signal when the phase difference signal indicates that the reference pulse lags the monitor signal in phase, or so that the phase of the enable pulse lags with respect to the video signal when the phase difference signal indicates that the reference pulse leads the monitor signal in phase.

18. The electro-optical device according to claim 17, in the electro-optical panel, the data lines being grouped into blocks, each block having n lines (n being an integer equal to or larger than 2),
the video signal being divided into n signals, which are respectively fed to n video signal lines in parallel, and
the sampling circuit sampling the n video signals supplied in parallel to the n video signal lines in response to one sampling signal, and then feeding the sampled signals to n data lines on a one to one basis.

19. Electronic equipment, comprising: the electro-optical device according to claim 17, and presenting an image.

20. A driving method for driving an electro-optical panel having a transistor and a pixel electrode at each intersection of each of a plurality of scanning lines and each of a plurality of data lines, comprising:
selecting a scanning line to supply a transistor corresponding to the selected scanning line with a signal to turn on the transistor;
generating a shift pulse to select a data line within a duration during which the scanning line is selected, and limiting the pulse width of the shift pulse to the pulse width of an enable pulse narrower than the shift pulse width and outputting the shift pulse with the narrower pulse width as a sampling pulse;
sampling a video signal within the pulse duration of the sampling signal and feeding the sampled signal to at least one data line;
outputting a phase difference signal representing a phase difference between a monitor signal supplied in synchronization with the video signal and a reference pulse supplied in synchronization with the enable pulse; and
adjusting the phase of the enable pulse so that the phase of the enable pulse leads with respect to the video signal when the phase difference signal indicates that the reference pulse lags the monitor signal in phase, or so that the phase of the enable pulse lags with respect to the video signal when the phase difference signal indicate that the reference pulse leads the monitor signal in phase.

21. The driving method for driving an electro-optical panel according to claim 20, further including:
outputting a plurality of signals different from each other in the amount of delay by delaying the reference clock signal synchronized with the video signal,
generating a selection signal to select one from among the plurality of signals output from the group of delay circuits, in accordance with the phase difference represented by the phase difference signal,
selecting the one of the signals represented by the selection signals, from among the plurality of signals output from the group of delay circuits, as an enable clock signal, and
generating the enable pulse from a portion of the enable clock signal to adjust the enable pulse.

22. The driving method for driving an electro-optical panel according to claim 21, the phase difference signal being a pulse signal, the pulse width of which becoming shorter as the delay of the reference pulse becomes longer with respect to the monitor signal, the driving method further comprising:
comparing the pulse width of the phase difference signal with a predetermined target time to determine which is longer, and
generating a selection signal to select a signal having a delay time one notch longer from among the plurality of signals output from the group of delay circuits when the comparison results are affirmative, or generating a selection signal to select a signal having a delay time one notch shorter from among the plurality of signals output from the group of delay circuits when the comparison results are non-affirmative.

23. The driving method for driving an electro-optical panel according to claim 21, further comprising:
adding disturbance to the generated selection signal, and
selecting a signal indicated by the selection signal to which disturbance is added, from among the plurality of signals output from the group of delay circuits to adjust the enable pulse.

24. The driving method for driving an electro-optical panel according to claim 21, further comprising:

generating the selection signal to select a signal having a longer phase delay from among the plurality of signals output from the group of delay circuits when the phase difference represented by the phase difference signal, which is the phase delay of the reference pulse with respect to the monitor signal falls within a constant value.

25. The driving method for driving an electro-optical panel according to claim 21, the phase difference signal being a pulse signal, the pulse width of which becoming shorter as the delay of the reference pulse becomes longer with respect to the monitor signal, the driving method comprising:

comparing the pulse width of the phase difference signal with a predetermined target time to determine which is longer, detecting whether or not previous comparison results coincide with current comparison results, and in case of coincident detection results between the previous and current comparison results, generating a selection signal to select a signal having a delay amount one notch longer from among the plurality of signals output from the group of delay circuits when the current comparison results are affirmative, or generating a selection signal to select a signal having a delay amount one notch shorter from among the plurality of signals output from the group of delay circuits when the current comparison results are not affirmative, or in case of non-coincident detection results between the previous and current comparison results, generating a selection signal to select a signal having a delay amount several notches longer from among the plurality of signals output from the group of delay circuits when the current comparison results are affirmative, or generating a selection signal to select a signal having a delay amount several notches shorter from among the plurality of signals output from the group of delay circuits when the current comparison results are not affirmative.

* * * * *